US011240062B2

(12) United States Patent
Dormiani et al.

(10) Patent No.: US 11,240,062 B2
(45) Date of Patent: Feb. 1, 2022

(54) ASYMMETRIC CAN-BASED COMMUNICATION FOR AERIAL VEHICLES

(71) Applicant: Wing Aviation LLC, Mountain View, CA (US)

(72) Inventors: Parsa Dormiani, Mountain View, CA (US); Brian Viele, Mountain View, CA (US)

(73) Assignee: Wing Aviation LLC, Mountain View, CA (US)

( * ) Notice: Subject to any disclaimer, the term of this patent is extended or adjusted under 35 U.S.C. 154(b) by 0 days.

(21) Appl. No.: 16/506,992

(22) Filed: Jul. 9, 2019

(65) Prior Publication Data

US 2019/0334741 A1    Oct. 31, 2019

Related U.S. Application Data

(63) Continuation of application No. 15/661,974, filed on Jul. 27, 2017, now Pat. No. 10,382,225.

(51) Int. Cl.
*G05D 1/00* (2006.01)
*B64C 13/50* (2006.01)
(Continued)

(52) U.S. Cl.
CPC ...... *H04L 12/40195* (2013.01); *B64C 13/503* (2013.01); *B64C 13/505* (2018.01);
(Continued)

(58) Field of Classification Search
CPC ......... H04L 12/40195; H04L 12/40176; H04L 12/40169; H04L 12/40; H04L 12/28;
(Continued)

(56) References Cited

U.S. PATENT DOCUMENTS 8,151,024 B2    4/2012 Nigoghosian et al.
8,447,553 B1 *  5/2013 Roe ...................... G01R 31/003
                                       702/108
(Continued)

FOREIGN PATENT DOCUMENTS

EP      2717108       4/2014
WO   2005/053223      6/2005
(Continued)

OTHER PUBLICATIONS

Australian Government, Examination Report No. 1 dated Dec. 1, 2020, issued in connection with Australian Patent Application No. 2018307808, 4 pages.
(Continued)

*Primary Examiner* — Jeffrey M Rutkowski
*Assistant Examiner* — Luna Weissberger
(74) *Attorney, Agent, or Firm* — McDonnell Boehnen Hulbert & Berghoff LLP

(57) ABSTRACT

An example embodiment includes a plurality of flight modules including a primary flight module and a secondary flight module. The embodiment includes a CAN controller, a second CAN controller, a first CAN bus configured to transmit primary control signals from the first CAN controller to the primary flight module and to the secondary flight module, and a second CAN bus configured to transmit secondary control signals from the second CAN controller to the primary flight module and the secondary flight module. The primary flight module is configured to perform functions responsive to receiving the primary control signals, and not in response to receiving the secondary control signals and the secondary flight module is configured to perform functions responsive to receiving the secondary control signals, and not in response to receiving the primary control signals.

20 Claims, 17 Drawing Sheets

(51) Int. Cl.
*H04L 12/40* (2006.01)
*B64C 39/04* (2006.01)
*B64C 29/02* (2006.01)
*B64C 39/02* (2006.01)

(52) U.S. Cl.
CPC ............ *B64C 29/02* (2013.01); *B64C 39/024* (2013.01); *B64C 39/04* (2013.01); *G05D 1/0077* (2013.01); *B64C 2201/027* (2013.01); *B64C 2201/088* (2013.01); *B64C 2201/104* (2013.01); *B64C 2201/108* (2013.01); *B64C 2201/141* (2013.01); *H04L 12/40176* (2013.01); *H04L 2012/4028* (2013.01); *H04L 2012/40215* (2013.01); *H04L 2012/40267* (2013.01)

(58) Field of Classification Search
CPC ......... H04L 12/40215; H04L 12/40208; H04L 12/4028; H04L 12/40267; H04L 41/0668; H04L 45/22; H04L 45/28
USPC ......................................................... 370/218
See application file for complete search history.

(56) References Cited

U.S. PATENT DOCUMENTS

| | | | | |
|---|---|---|---|---|
| 9,471,064 | B1* | 10/2016 | Boland | ................. G06N 20/10 |
| 9,704,408 | B2 | 7/2017 | Yu et al. | |
| 2007/0164166 | A1 | 7/2007 | Hirvonen | |
| 2012/0290153 | A1 | 11/2012 | Osloe et al. | |
| 2016/0112151 | A1 | 4/2016 | Chedas et al. | |
| 2016/0285774 | A1 | 9/2016 | Downey et al. | |
| 2016/0307447 | A1* | 10/2016 | Johnson | ................. B60L 58/12 |
| 2016/0347462 | A1* | 12/2016 | Clark | ..................... B64D 17/80 |
| 2016/0357895 | A1* | 12/2016 | Hyde | ..................... G06F 30/20 |
| 2017/0019478 | A1 | 1/2017 | Russo et al. | |
| 2017/0203705 | A1 | 7/2017 | Fritz et al. | |
| 2018/0237148 | A1* | 8/2018 | Hehn | ................... B64C 39/024 |

FOREIGN PATENT DOCUMENTS

| | | |
|---|---|---|
| WO | 2016/193884 | 8/2016 |
| WO | 2017/035590 | 3/2017 |

OTHER PUBLICATIONS

Australian Government, Notice of Acceptance dated Apr. 13, 2021, issued in connection with Australian Patent Application No. 2018307808, 3 pages.

International Searching Authority, International Search Report and Written Opinion dated Oct. 16, 2018, issued in connection with International Patent Application No. PCT/US2018/044001, filed on Jul. 27, 2018, 14 pages.

* cited by examiner

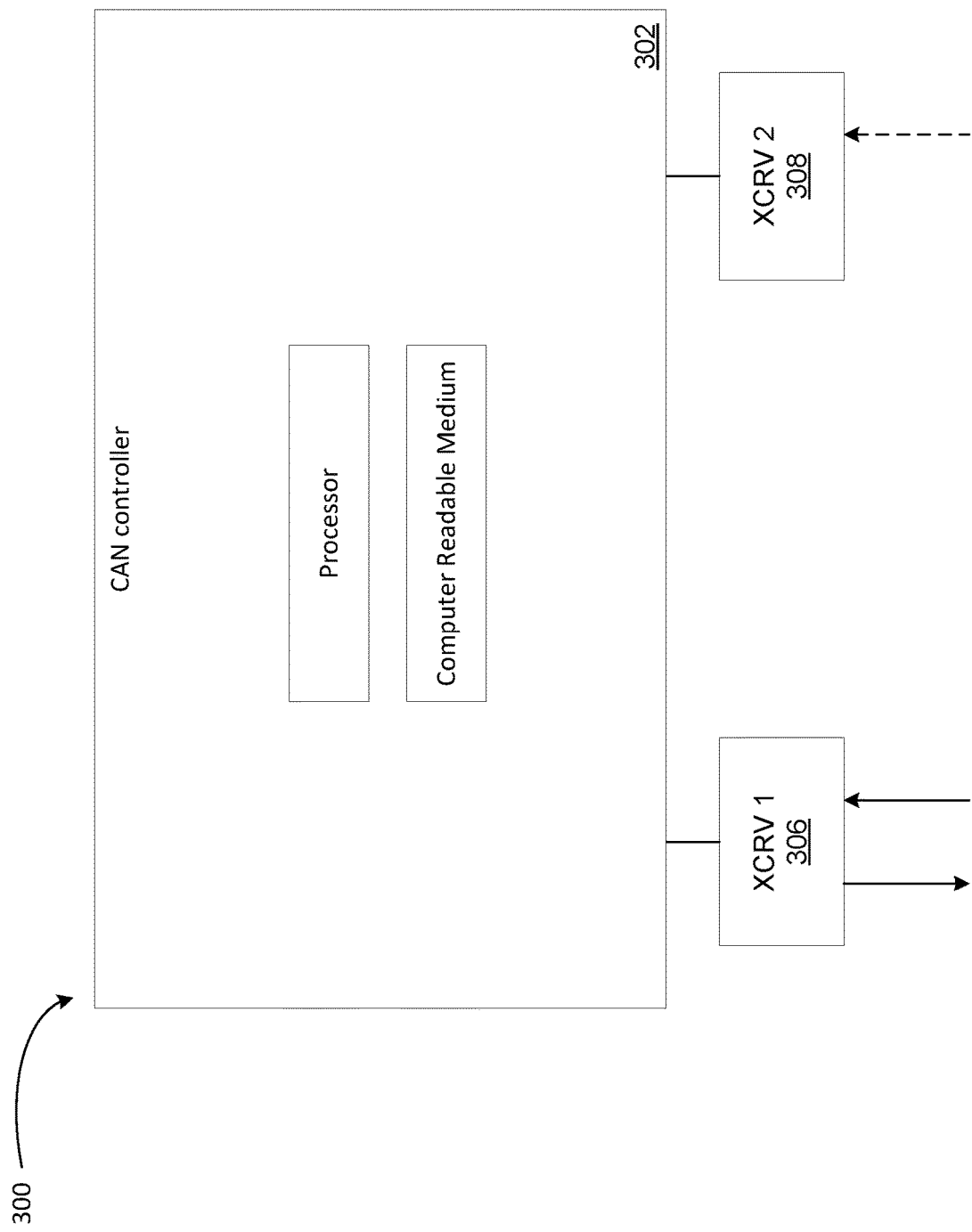

ASYMMETRIC CAN-BASED COMMUNICATION FOR AERIAL VEHICLES

CROSS-REFERENCE TO RELATED APPLICATIONS

This application is a continuation of, and claims priority to, U.S. patent application Ser. No. 15/661,974, filed Jul. 27, 2017, which is incorporated herein by reference in its entirety and for all purposes.

BACKGROUND

An unmanned system, which may also be referred to as an autonomous vehicle, is a vehicle capable of travel without a physically-present human operator. An unmanned system may operate in a remote-control mode, in an autonomous mode, or in a partially autonomous mode.

When an unmanned system operates in a remote-control mode, a pilot or driver that is at a remote location can control the unmanned vehicle via commands that are sent to the unmanned vehicle via a wireless link. When the unmanned system operates in autonomous mode, the unmanned system typically moves based on pre-programmed navigation waypoints, dynamic automation systems, or a combination of these. Further, some unmanned systems can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned systems exist for various different environments. For instance, unmanned systems exist for operation in the air, on the ground, underwater, and in space. Examples include quad-copters and tail-sitter UAVs, among others. Unmanned systems also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible.

SUMMARY

Example systems and methods may relate to communication over a controller area network (CAN) within an aerial vehicle, such as an unmanned aerial system (UAS). The network may include a plurality of CAN nodes connected by two or more CAN buses. The CAN nodes may include a control tier having two or more CAN controllers and a plurality of flight modules that are controllable by the CAN controllers. The network may also include two or more CAN buses that connect the CAN controllers to the flight modules. The CAN controllers, flight modules, and CAN buses may all perform redundant functions, such that, if one component of the network fails, the aerial vehicle may perform normally. Allowing for components to fail in this way may make aerial vehicles that incorporate the network more safe and reliable.

In one example, a system is provided that includes a plurality of flight modules that include a primary flight module and a secondary flight module. The secondary flight module is configured to perform functions redundant to functions performed by the primary flight module. The system also includes a first controller area network (CAN) controller, a second CAN controller, a first CAN bus configured to transmit primary control signals from the first CAN controller to the primary flight module and to the secondary flight module, and a second CAN bus configured to transmit secondary control signals from the second CAN controller to the primary flight module and the secondary flight module. During a normal operating state, the primary flight module is configured to perform functions responsive to receiving the primary control signals, and not in response to receiving the secondary control signals and the secondary flight module is configured to perform functions responsive to receiving the secondary control signals, and not in response to receiving the primary control signals.

In another example, a method is provided that includes sending primary control signals, by a first CAN controller, to a primary flight module and a secondary flight module. The method also includes, responsive to receiving the primary control signals from the first CAN controller, performing, by the primary flight module and not by the secondary flight module, a flight related function. The method further includes sending secondary control signals, by a second CAN controller, to the secondary flight module and to the primary flight module. The method additionally includes responsive to receiving the secondary control signals from the second CAN controller, performing, by the secondary flight module and not by the primary flight module, a flight related function redundant to the flight related function performed by the primary flight module.

In another example, a system is provided that includes an aerial vehicle, a plurality including a primary flight module and a secondary flight module, a plurality of CAN controllers including a first CAN controller and a second CAN controller, a plurality of processors, and a non-transitory computer readable medium. The system also includes program instructions stored on the non-transitory computer readable medium and executable by the plurality of processors to send primary control signals, by a first controller area network (CAN) controller, to a primary flight module and a secondary flight module. The program instructions also, responsive to receiving the primary control signals from the first CAN controller, perform, by the primary flight module and not by the secondary flight module, a flight related function. The program instructions further send secondary control signals, by a second CAN controller, to the secondary flight module and to the primary flight module. The program instructions additionally include, responsive to receiving the secondary control signals from the second CAN controller, perform, by the secondary flight module and not by the primary flight module, a flight related function redundant to the flight related function performed by the primary flight module.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

BRIEF DESCRIPTION OF THE DRAWINGS

FIG. 3A is a simplified block diagram of a CAN node, according to an example embodiment.

DETAILED DESCRIPTION

Figure 1A:
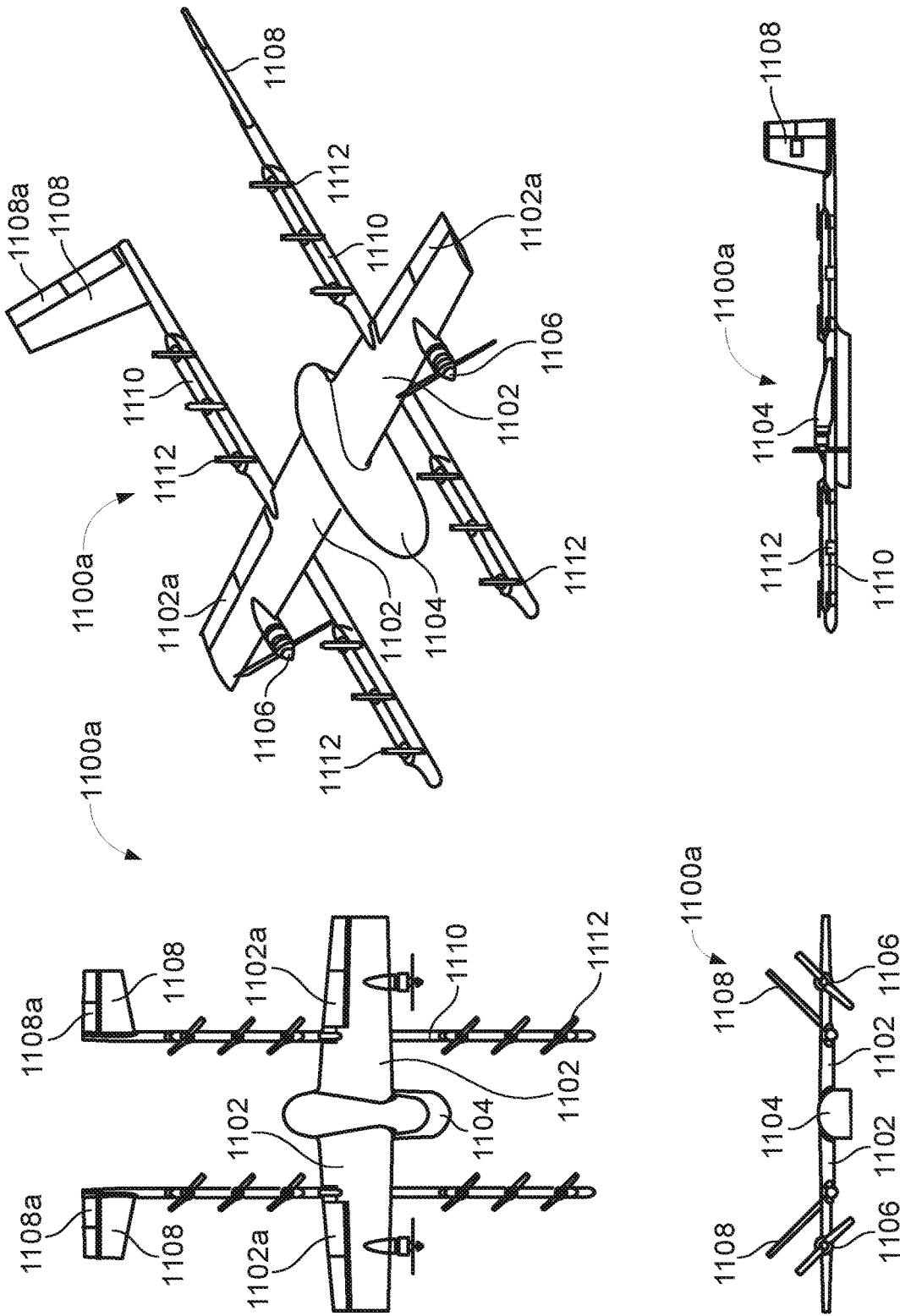
FIG. 1A is a simplified illustration of an unmanned aerial vehicle, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

I. OVERVIEW

Example embodiments may include or otherwise relate to systems and methods for CAN-based communication. For example, an aerial vehicle may include a plurality of CAN nodes. The CAN nodes may include a control tier having a plurality of CAN controllers. At least two of the CAN controllers may perform functions that are redundant. The CAN nodes may also include a plurality of flight modules. At least two of the flight modules may perform functions that are redundant as well. The CAN controllers may control the flight modules via two or more CAN buses connected to the same CAN controllers and flight modules. Having redundant CAN controllers, flight modules, and CAN buses allows for one or more components to fail while still allowing the aerial vehicle to operate normally. These redundancies may allow for a safer, more reliable aerial vehicle.

A CAN-based communication system may be connected in an asymmetric fashion. That is, some flight modules may perform functions responsive to control signals received from one CAN controller, but not another. In other examples, CAN controllers or flight modules may send signals via one CAN bus, but not another. Such asymmetric interactions within the communication system may allow for one component to fail without tainting other components of the system. For instance, a flight module may fail such that it floods a CAN bus with signals, but, because it is not configured to send signals via another CAN bus, that other CAN bus may continue to function normally. Thus, these asymmetric connections may allow for a robust and adaptive system.

A CAN-based communication system may operate differently depending on an operating state of the system. During a normal operating state, a primary flight module may receive primary control signals from a first CAN controller via a first CAN bus and secondary control signals from a second CAN controller via a second CAN bus. Responsive to receiving the primary control signals, and without any additional guidance from any secondary control signals, the primary flight module may perform functions. For instance, a global positioning system (GPS) may determine a current location of the aerial vehicle in response to receiving the primary control signals, or a motor controller may cause a propeller to rotate at a particular speed in response to receiving the primary control signals. Similarly, during the normal operating state, a secondary flight module may receive the primary control signals the secondary control signals. Responsive to receiving the secondary control signals, and without any additional guidance from the primary control signals, the secondary flight module may perform functions redundant to the functions performed by the primary flight module.

In some examples, one or more CAN nodes of a CAN-based communication system may determine a failure state of the system. For instance, a CAN controller, flight module, or CAN bus may stop working as it normally would. A CAN node may determine, for example, that a particular CAN controller has stopped sending control signals, or that a flight module is providing incorrect data. Responsive to determining the failure state, a number of actions may be performed depending on a context of the failure state. That is, different actions may be performed based on which component has stopped working, and in what way that component has failed.

In some examples, it may be determined that a CAN controller has stopped sending control signals. Responsive to determining this failure state of the CAN controller, a different CAN controller of the system may send additional control signals to a flight module previously controlled by the failed CAN controller. The flight module, in turn, may perform functions responsive to the control signals sent by the different CAN controller.

In other examples, a CAN node of the system may determine a failure state of a flight module. Responsive to determining the failure state of the flight module, a different flight module may take control of controllable elements that were previously controlled by the failed flight module. For example, a flight module may control one or more motors that were previously controlled by the failed flight module.

In other examples, the different flight module may continue to perform functions redundant to functions previously performed by the failed flight module. Other failure states within the system may be determined by the system, and other actions may be performed in response to determining the failure states. In this way, the CAN-based communication system may be adaptive to multiple failure contexts, and may continue to perform functions despite failure states of one or more components of the system. Such adaptability may allow for increased safety and reliability of an aerial vehicle that incorporates the CAN-based communication system.

In some examples, in response to determining one or more detected failure states of the system, the CAN-based communication may cause an aerial vehicle to perform an action. For instance, the system may cause the aerial vehicle to land. In other examples, the system may cause the aerial vehicle to return to a home base. In still other examples, the system may cause the aerial vehicle to unload a package carried by the aerial vehicle before landing or returning to a home base. Other actions are possible as well. Such actions may save the aerial vehicle from being damaged, and may save costs associated with such damage.

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, and components, and circuits have not been described in detail so as not to unnecessarily obscure aspects of the embodiments.

II. ILLUSTRATIVE UNMANNED VEHICLES

Herein, the terms "unmanned aerial system" and "UAS" refer to any autonomous or semi-autonomous vehicle that is capable of performing some functions without a physically present human pilot.

A UAS can take various forms. For example, a UAS may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "unmanned aerial vehicle system" (UAVS), or "unmanned aerial vehicle" (UAV) may also be used to refer to a UAS.

FIG. 1A is a simplified illustration providing various views of a UAS, according to an example embodiment. In particular, FIG. 1A shows an example of a fixed-wing UAS 1100a, which may also be referred to as an airplane, an aeroplane, a biplane, a glider, or a plane, among other possibilities. The fixed-wing UAS 1100a, as the name implies, has stationary wings 1102 that generate lift based on the wing shape and the vehicle's forward airspeed. For instance, the two wings 1102 may have an airfoil-shaped cross section to produce an aerodynamic force on the UAS 1100a.

As depicted, the fixed-wing UAS 1100a may include a wing body or fuselage 1104. The wing body 1104 may contain, for example, control electronics such as an inertial measurement unit (IMU) and/or an electronic speed controller, batteries, other sensors, and/or a payload, among other possibilities. The illustrative UAS 1100a may also include landing gear (not shown) to assist with controlled take-offs and landings. In other embodiments, other types of UASs without landing gear are also possible.

The UAS 1100a further includes propulsion units 1106 positioned on the wings 1106 (or fuselage), which can each include a motor, shaft, and propeller, for propelling the UAS 1100a. Stabilizers 1108 (or fins) may also be attached to the UAS 1110a to stabilize the UAS's yaw (turn left or right) during flight. In some embodiments, the UAS 1100a may be also be configured to function as a glider. To do so, UAS 1100a may power off its motor, propulsion units, etc., and glide for a period of time. In the UAS 1100a, a pair of rotor supports 1110 extend beneath the wings 1106, and a plurality of rotors 1112 are attached rotor supports 1110. Rotors 1110 may be used during a hover mode wherein the UAS 1110a is descending to a delivery location, or ascending following a delivery. In the example UAS 1100a, stabilizers 1108 are shown attached to the rotor supports 1110.

During flight, the UAS 1100a may control the direction and/or speed of its movement by controlling its pitch, roll, yaw, and/or altitude. For example, the stabilizers 1108 may include one or more rudders 1108a for controlling the UAS's yaw, and the wings 1102 may include one or more elevators for controlling the UAS's pitch and/or one or more ailerons 1102a for controlling the UAS's roll. As another example, increasing or decreasing the speed of all the propellers simultaneously can result in the UAS 1100a increasing or decreasing its altitude, respectively.

Figure 1B:
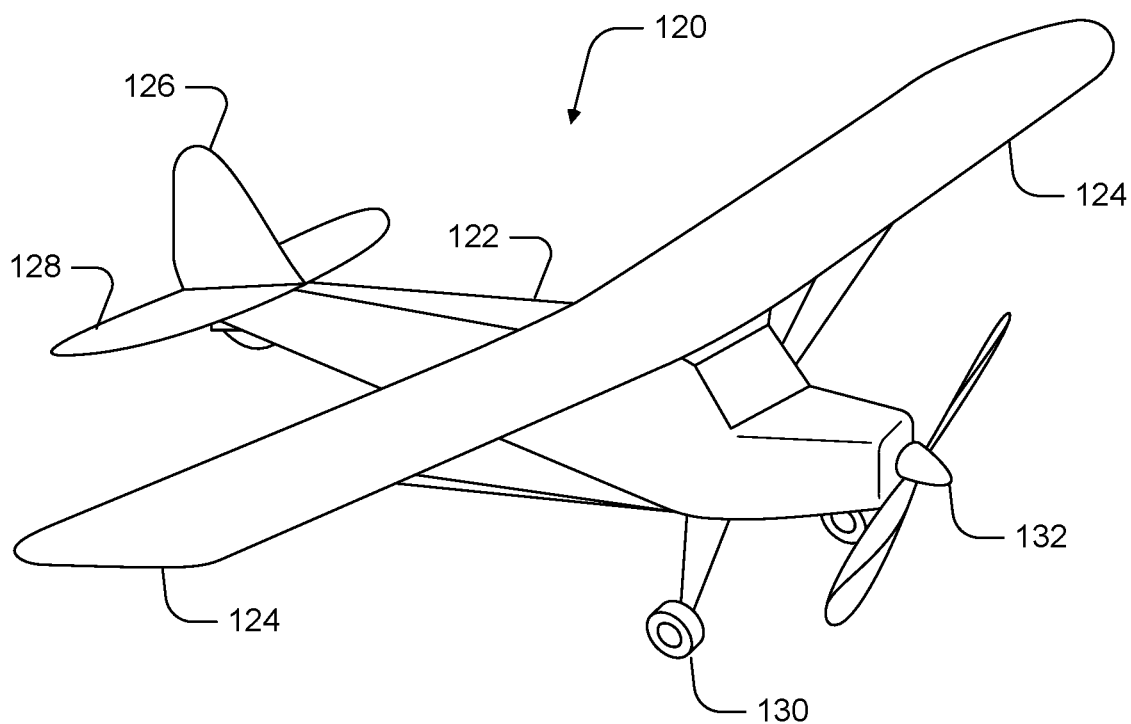
FIG. 1B is a simplified illustration of an unmanned aerial vehicle, according to an example embodiment.

Similarly, FIG. 1B shows another example of a fixed-wing UAS 120. The fixed-wing UAS 120 includes a fuselage 122, two wings 124 with an airfoil-shaped cross section to provide lift for the UAS 120, a vertical stabilizer 126 (or fin) to stabilize the plane's yaw (turn left or right), a horizontal stabilizer 128 (also referred to as an elevator or tailplane) to stabilize pitch (tilt up or down), landing gear 130, and a propulsion unit 132, which can include a motor, shaft, and propeller.

Figure 1C:
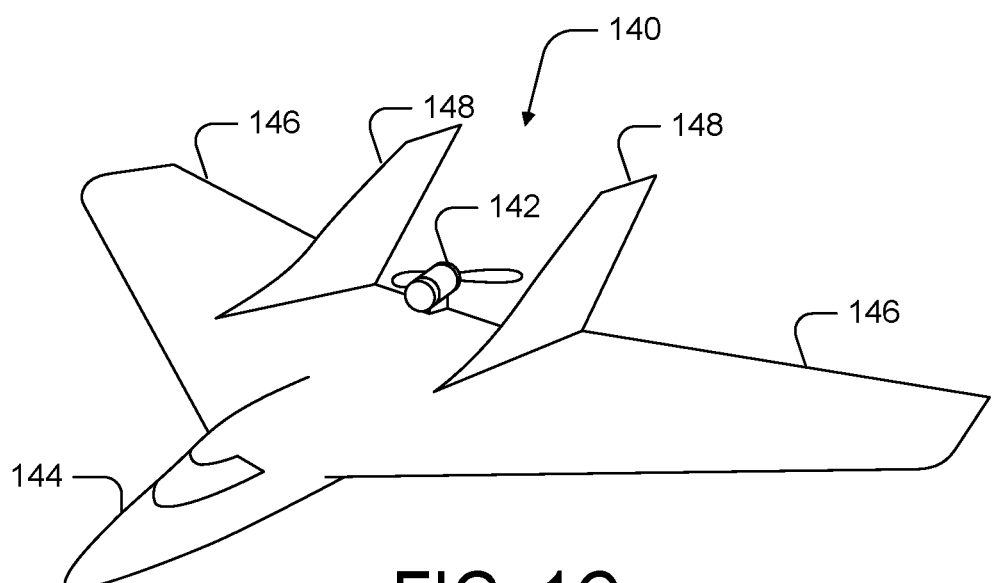
FIG. 1C is a simplified illustration of an unmanned aerial vehicle, according to an example embodiment.

FIG. 1C shows an example of a UAS 140 with a propeller in a pusher configuration. The term "pusher" refers to the fact that a propulsion unit 142 is mounted at the back of the UAS and "pushes" the vehicle forward, in contrast to the propulsion unit being mounted at the front of the UAS. Similar to the description provided for FIGS. 1A and 1B, FIG. 1C depicts common structures used in a pusher plane, including a fuselage 144, two wings 146, vertical stabilizers 148, and the propulsion unit 142, which can include a motor, shaft, and propeller.

Figure 1D:
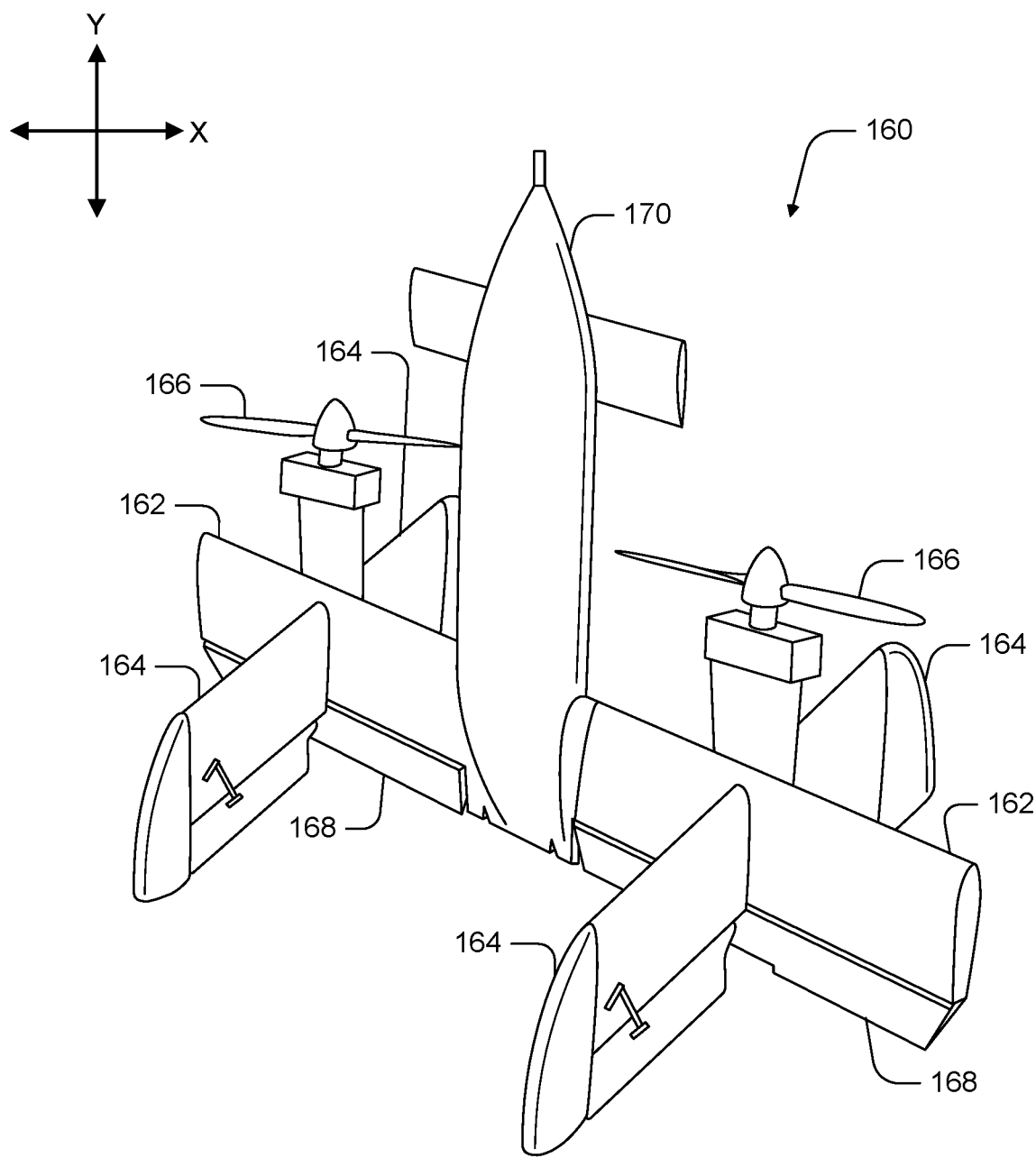
FIG. 1D is a simplified illustration of an unmanned aerial vehicle, according to an example embodiment.

FIG. 1D shows an example of a tail-sitter UAS 160. In the illustrated example, the tail-sitter UAS 160 has fixed wings 162 to provide lift and allow the UAS 160 to glide horizontally (e.g., along the x-axis, in a position that is approximately perpendicular to the position shown in FIG. 1D). However, the fixed wings 162 also allow the tail-sitter UAS 160 to take off and land vertically on its own.

For example, at a launch site, the tail-sitter UAS 160 may be positioned vertically (as shown) with its fins 164 and/or wings 162 resting on the ground and stabilizing the UAS 160 in the vertical position. The tail-sitter UAS 160 may then take off by operating its propellers 166 to generate an upward thrust (e.g., a thrust that is generally along the y-axis). Once at a suitable altitude, the tail-sitter UAS 160 may use its flaps 168 to reorient itself in a horizontal position, such that its fuselage 170 is closer to being aligned with the x-axis than the y-axis. Positioned horizontally, the propellers 166 may provide forward thrust so that the tail-sitter UAS 160 can fly in a similar manner as a typical airplane.

Many variations on the illustrated fixed-wing UASs are possible. For instance, fixed-wing UASs may include more or fewer propellers, and/or may utilize a ducted fan or multiple ducted fans for propulsion. Further, UASs with more wings (e.g., an "x-wing" configuration with four wings), with fewer wings, or even with no wings, are also possible.

Figure 1E:
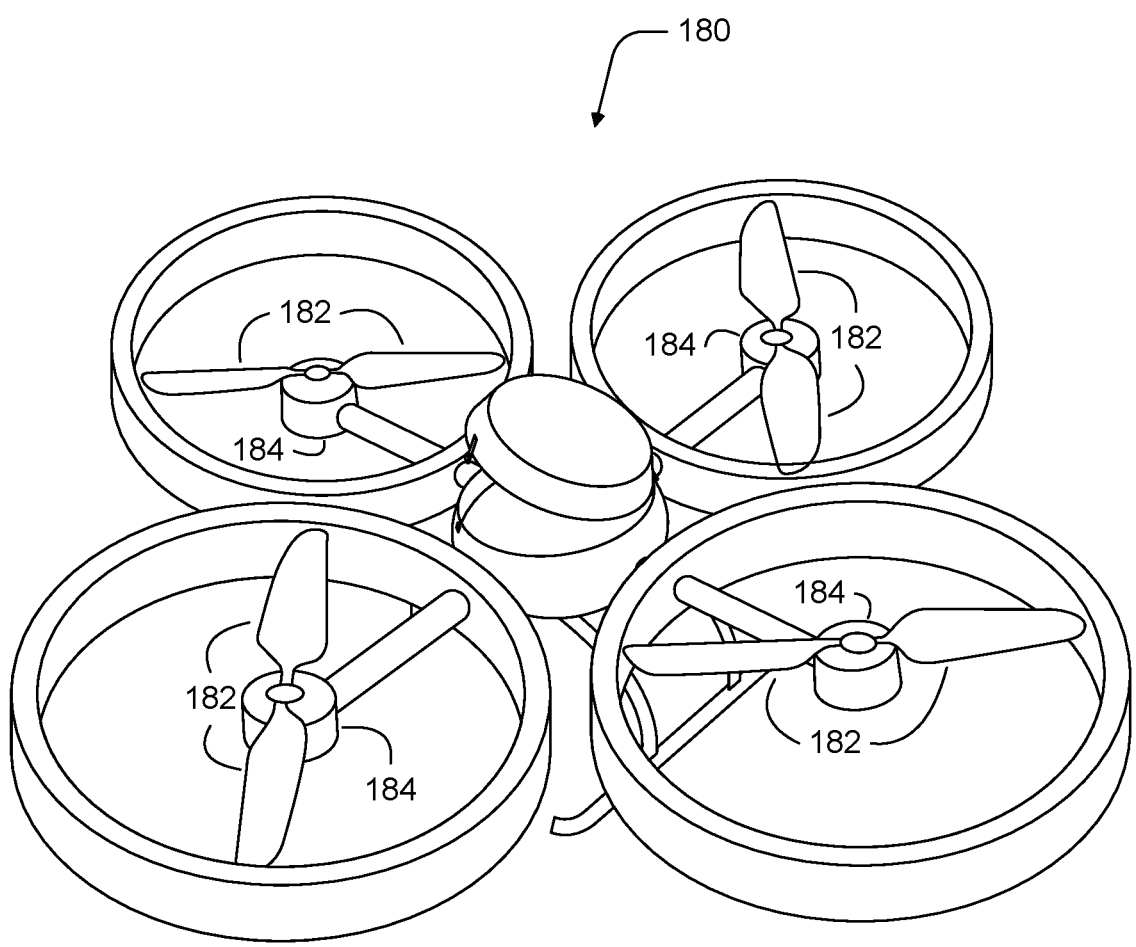
FIG. 1E is a simplified illustration of an unmanned aerial vehicle, according to an example embodiment.

As noted above, some embodiments may involve other types of UASs, in addition to or in the alternative to fixed-wing UASs. For instance, FIG. 1E shows an example of a rotorcraft that is commonly referred to as a multicopter 180. The multicopter 180 may also be referred to as a quadcopter, as it includes four rotors 182. It should be understood that example embodiments may involve a rotorcraft with more or fewer rotors than the multicopter 180. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to the multicopter 180 in greater detail, the four rotors 182 provide propulsion and maneuverability for the multicopter 180. More specifically, each rotor 182 includes blades that are attached to a motor 184. Configured as such, the rotors 182 may allow the multicopter 180 to take off and land vertically, to maneuver in any direction, and/or to hover. Further, the pitch of the blades may be adjusted as a group and/or differentially, and may allow the multicopter 180 to control its pitch, roll, yaw, and/or altitude.

It should be understood that references herein to an "unmanned" aerial vehicle or UAS can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAS may be configured to allow a remote operator to take over functions that can otherwise be controlled autonomously by the UAS. Yet further, a given type of function may be controlled remotely at one level of abstraction and performed autonomously at another level of abstraction. For example, a remote operator could control high level navigation decisions for a UAS, such as by specifying that the UAS should travel from one location to another (e.g., from a warehouse in a suburban area to a delivery address in a nearby city), while the UAS's navigation system autonomously controls more fine-grained navigation decisions, such as the specific route to take between the two locations, specific flight controls to achieve the route and avoid obstacles while navigating the route, and so on.

More generally, it should be understood that the example UASs described herein are not intended to be limiting. Example embodiments may relate to, be implemented within, or take the form of any type of unmanned aerial vehicle.

III. ILLUSTRATIVE UAS COMPONENTS

Figure 2:
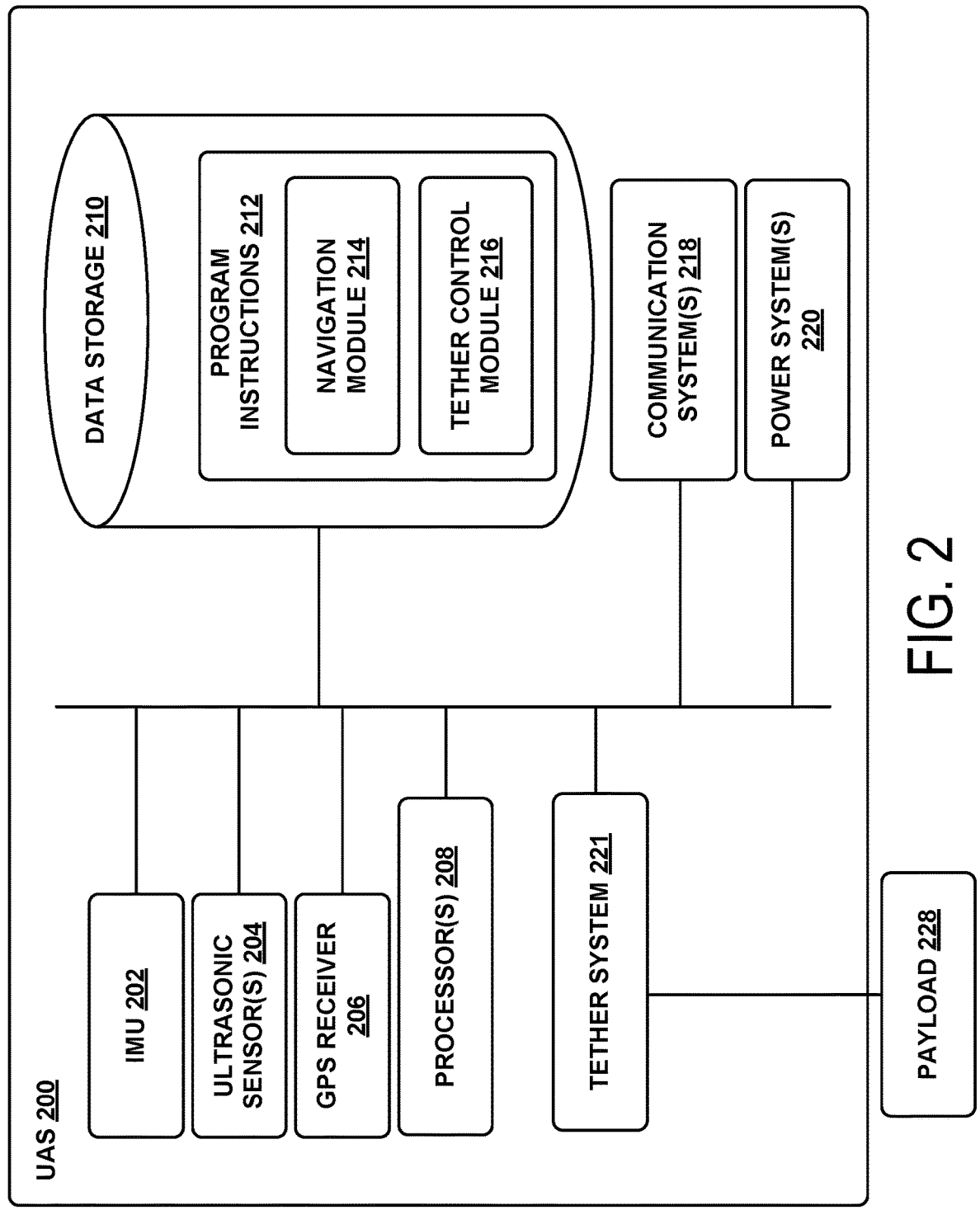
FIG. 2 is a simplified block diagram illustrating components of an unmanned aerial vehicle, according to an example embodiment.

FIG. 2 is a simplified block diagram illustrating components of a UAS 200, according to an example embodiment. UAS 200 may take the form of, or be similar in form to, one of the UASs 100, 120, 140, 160, and 180 described in reference to FIGS. 1A-1E. However, UAS 200 may also take other forms.

UAS 200 may include various types of sensors, and may include a computing system configured to provide the functionality described herein. In the illustrated embodiment, the sensors of UAS 200 include an inertial measurement unit (IMU) 202, ultrasonic sensor(s) 204, and a GPS 206, among other possible sensors and sensing systems.

In the illustrated embodiment, UAS 200 also includes one or more processors 208. A processor 208 may be a general-purpose processor or a special purpose processor (e.g., digital signal processors, application specific integrated circuits, etc.). The one or more processors 208 can be configured to execute computer-readable program instructions 212 that are stored in the data storage 210 and are executable to provide the functionality of a UAS described herein.

The data storage 210 may include or take the form of one or more computer-readable storage media that can be read or accessed by at least one processor 208. The one or more computer-readable storage media can include volatile and/or non-volatile storage components, such as optical, magnetic, organic or other memory or disc storage, which can be integrated in whole or in part with at least one of the one or more processors 208. In some embodiments, the data storage 210 can be implemented using a single physical device (e.g., one optical, magnetic, organic or other memory or disc storage unit), while in other embodiments, the data storage 210 can be implemented using two or more physical devices.

As noted, the data storage 210 can include computer-readable program instructions 212 and perhaps additional data, such as diagnostic data of the UAS 200. As such, the data storage 210 may include program instructions 212 to perform or facilitate some or all of the UAS functionality described herein. For instance, in the illustrated embodiment, program instructions 212 include a navigation module 214 and a tether control module 216.

A. Sensors

In an illustrative embodiment, IMU 202 may include both an accelerometer and a gyroscope, which may be used together to determine an orientation of the UAS 200. In particular, the accelerometer can measure the orientation of the vehicle with respect to earth, while the gyroscope measures the rate of rotation around an axis. IMUs are commercially available in low-cost, low-power packages. For instance, an IMU 202 may take the form of or include a miniaturized MicroElectroMechanical System (MEMS) or a NanoElectroMechanical System (NEMS). Other types of IMUs may also be utilized.

An IMU 202 may include other sensors, in addition to accelerometers and gyroscopes, which may help to better determine position and/or help to increase autonomy of the UAS 200. Two examples of such sensors are magnetometers and pressure sensors. In some embodiments, a UAS may include a low-power, digital 3-axis magnetometer, which can be used to realize an orientation independent electronic compass for accurate heading information. However, other types of magnetometers may be utilized as well. Other examples are also possible. Further, note that a UAS could include some or all of the above-described inertia sensors as separate components from an IMU.

UAS 200 may also include a pressure sensor or barometer, which can be used to determine the altitude of the UAS 200. Alternatively, other sensors, such as sonic altimeters or radar altimeters, can be used to provide an indication of altitude, which may help to improve the accuracy of and/or prevent drift of an IMU.

In a further aspect, UAS 200 may include one or more sensors that allow the UAS to sense objects in the environment. For instance, in the illustrated embodiment, UAS 200 includes ultrasonic sensor(s) 204. Ultrasonic sensor(s) 204 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LA- DAR) system, and/or an infrared or forward-looking infrared (FLIR) system, among other possibilities.

In some embodiments, UAS 200 may also include one or more imaging system(s). For example, one or more still and/or video cameras may be utilized by UAS 200 to capture image data from the UAS's environment. As a specific example, charge-coupled device (CCD) cameras or complementary metal-oxide-semiconductor (CMOS) cameras can be used with unmanned vehicles. Such imaging sensor(s) have numerous possible applications, such as obstacle avoidance, localization techniques, ground tracking for more accurate navigation (e.g., by applying optical flow techniques to images), video feedback, and/or image recognition and processing, among other possibilities.

UAS 200 may also include a GPS receiver 206. The GPS receiver 206 may be configured to provide data that is typical of well-known GPS systems, such as the GPS coordinates of the UAS 200. Such GPS data may be utilized by the UAS 200 for various functions. As such, the UAS may use its GPS receiver 206 to help navigate to the caller's location, as indicated, at least in part, by the GPS coordinates provided by their mobile device. Other examples are also possible.

B. Navigation and Location Determination

The navigation module 214 may provide functionality that allows the UAS 200 to, e.g., move about its environment and reach a desired location. To do so, the navigation module 214 may control the altitude and/or direction of flight by controlling the mechanical features of the UAS that affect flight (e.g., its rudder(s), elevator(s), aileron(s), and/or the speed of its propeller(s)).

In order to navigate the UAS 200 to a target location, the navigation module 214 may implement various navigation techniques, such as map-based navigation and localization-based navigation, for instance. With map-based navigation, the UAS 200 may be provided with a map of its environment, which may then be used to navigate to a particular location on the map. With localization-based navigation, the UAS 200 may be capable of navigating in an unknown environment using localization. Localization-based navigation may involve the UAS 200 building its own map of its environment and calculating its position within the map and/or the position of objects in the environment. For example, as a UAS 200 moves throughout its environment, the UAS 200 may continuously use localization to update its map of the environment. This continuous mapping process may be referred to as simultaneous localization and mapping (SLAM). Other navigation techniques may also be utilized.

In some embodiments, the navigation module 214 may navigate using a technique that relies on waypoints. In particular, waypoints are sets of coordinates that identify points in physical space. For instance, an air-navigation waypoint may be defined by a certain latitude, longitude, and altitude. Accordingly, navigation module 214 may cause UAS 200 to move from waypoint to waypoint, in order to ultimately travel to a final destination (e.g., a final waypoint in a sequence of waypoints).

In a further aspect, the navigation module 214 and/or other components and systems of the UAS 200 may be configured for "localization" to more precisely navigate to the scene of a target location. More specifically, it may be desirable in certain situations for a UAS to be within a threshold distance of the target location where a payload 228 is being delivered by a UAS (e.g., within a few feet of the target destination). To this end, a UAS may use a two-tiered approach in which it uses a more-general location-determination technique to navigate to a general area that is associated with the target location, and then use a more-refined location-determination technique to identify and/or navigate to the target location within the general area.

For example, the UAS 200 may navigate to the general area of a target destination where a payload 228 is being delivered using waypoints and/or map-based navigation. The UAS may then switch to a mode in which it utilizes a localization process to locate and travel to a more specific location. For instance, if the UAS 200 is to deliver a payload to a user's home, the UAS 200 may need to be substantially close to the target location in order to avoid delivery of the payload to undesired areas (e.g., onto a roof, into a pool, onto a neighbor's property, etc.). However, a GPS signal may only get the UAS 200 so far (e.g., within a block of the user's home). A more precise location-determination technique may then be used to find the specific target location.

Various types of location-determination techniques may be used to accomplish localization of the target delivery location once the UAS 200 has navigated to the general area of the target delivery location. For instance, the UAS 200 may be equipped with one or more sensory systems, such as, for example, ultrasonic sensors 204, infrared sensors (not shown), and/or other sensors, which may provide input that the navigation module 214 utilizes to navigate autonomously or semi-autonomously to the specific target location.

As another example, once the UAS 200 reaches the general area of the target delivery location (or of a moving subject such as a person or their mobile device), the UAS 200 may switch to a "fly-by-wire" mode where it is controlled, at least in part, by a remote operator, who can navigate the UAS 200 to the specific target location. To this end, sensory data from the UAS 200 may be sent to the remote operator to assist them in navigating the UAS 200 to the specific location.

As yet another example, the UAS 200 may include a module that is able to signal to a passer-by for assistance in either reaching the specific target delivery location; for example, the UAS 200 may display a visual message requesting such assistance in a graphic display, play an audio message or tone through speakers to indicate the need for such assistance, among other possibilities. Such a visual or audio message might indicate that assistance is needed in delivering the UAS 200 to a particular person or a particular location, and might provide information to assist the passer-by in delivering the UAS 200 to the person or location (e.g., a description or picture of the person or location, and/or the person or location's name), among other possibilities. Such a feature can be useful in a scenario in which the UAS is unable to use sensory functions or another location-determination technique to reach the specific target location. However, this feature is not limited to such scenarios.

In some embodiments, once the UAS 200 arrives at the general area of a target delivery location, the UAS 200 may utilize a beacon from a user's remote device (e.g., the user's mobile phone) to locate the person. Such a beacon may take various forms. As an example, consider the scenario where a remote device, such as the mobile phone of a person who requested a UAS delivery, is able to send out directional signals (e.g., via an RF signal, a light signal and/or an audio signal). In this scenario, the UAS 200 may be configured to navigate by "sourcing" such directional signals—in other words, by determining where the signal is strongest and navigating accordingly. As another example, a mobile device can emit a frequency, either in the human range or outside the human range, and the UAS 200 can listen for that frequency and navigate accordingly. As a related example, if the UAS 200 is listening for spoken commands, then the UAS 200 could utilize spoken statements, such as "I'm over here!" to source the specific location of the person requesting delivery of a payload.

In an alternative arrangement, a navigation module may be implemented at a remote computing device, which communicates wirelessly with the UAS 200. The remote computing device may receive data indicating the operational state of the UAS 200, sensor data from the UAS 200 that allows it to assess the environmental conditions being experienced by the UAS 200, and/or location information for the UAS 200. Provided with such information, the remote computing device may determine altitudinal and/or directional adjustments that should be made by the UAS 200 and/or may determine how the UAS 200 should adjust its mechanical features (e.g., its rudder(s), elevator(s), aileron(s), and/or the speed of its propeller(s)) in order to effectuate such movements. The remote computing system may then communicate such adjustments to the UAS 200 so it can move in the determined manner.

C. Communication Systems

In a further aspect, the UAS 200 includes one or more communication systems 218. The communications systems 218 may include one or more wireless interfaces and/or one or more wireline interfaces, which allow the UAS 200 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, a UAS 200 may include communication systems 218 that allow for both short-range communication and long-range communication. For example, the UAS 200 may be configured for short-range communications using Bluetooth and for long-range communications under a CDMA protocol. In such an embodiment, the UAS 200 may be configured to function as a "hot spot;" or in other words, as a gateway or proxy between a remote support device and one or more data networks, such as a cellular network and/or the Internet. Configured as such, the UAS 200 may facilitate data communications that the remote support device would otherwise be unable to perform by itself.

For example, the UAS 200 may provide a WiFi connection to a remote device, and serve as a proxy or gateway to a cellular service provider's data network, which the UAS might connect to under an LTE or a 3G protocol, for instance. The UAS 200 could also serve as a proxy or gateway to a high-altitude balloon network, a satellite network, or a combination of these networks, among others, which a remote device might not be able to otherwise access.

D. Power Systems

In a further aspect, the UAS 200 may include power system(s) 220. The power system 220 may include one or more batteries for providing power to the UAS 200. In one example, the one or more batteries may be rechargeable and each battery may be recharged via a wired connection between the battery and a power supply and/or via a wireless charging system, such as an inductive charging system that applies an external time-varying magnetic field to an internal battery.

E. Payload Delivery

The UAS 200 may employ various systems and configurations in order to transport and deliver a payload 228. In some implementations, the payload 228 of a given UAS 200 may include or take the form of a "package" designed to transport various goods to a target delivery location. For example, the UAS 200 can include a compartment, in which an item or items may be transported. Such a package may one or more food items, purchased goods, medical items, or any other object(s) having a size and weight suitable to be transported between two locations by the UAS. In other embodiments, a payload 228 may simply be the one or more items that are being delivered (e.g., without any package housing the items).

In some embodiments, the payload 228 may be attached to the UAS and located substantially outside of the UAS during some or all of a flight by the UAS. For example, the package may be tethered or otherwise releasably attached below the UAS during flight to a target location. In an embodiment where a package carries goods below the UAS, the package may include various features that protect its contents from the environment, reduce aerodynamic drag on the system, and prevent the contents of the package from shifting during UAS flight.

For instance, when the payload 228 takes the form of a package for transporting items, the package may include an outer shell constructed of water-resistant cardboard, plastic, or any other lightweight and water-resistant material. Further, in order to reduce drag, the package may feature smooth surfaces with a pointed front that reduces the frontal cross-sectional area. Further, the sides of the package may taper from a wide bottom to a narrow top, which allows the package to serve as a narrow pylon that reduces interference effects on the wing(s) of the UAS. This may move some of the frontal area and volume of the package away from the wing(s) of the UAS, thereby preventing the reduction of lift on the wing(s) cause by the package. Yet further, in some embodiments, the outer shell of the package may be constructed from a single sheet of material in order to reduce air gaps or extra material, both of which may increase drag on the system. Additionally or alternatively, the package may include a stabilizer to dampen package flutter. This reduction in flutter may allow the package to have a less rigid connection to the UAS and may cause the contents of the package to shift less during flight.

In order to deliver the payload, the UAV may include a tether system 221, which may$_{[CM1]}$ controlled by the tether control module 216 in order to lower the payload 228 to the ground while the UAV hovers above. The tether system 221 may include a tether, which is couplable to a payload 228 (e.g., a package). The tether 224 may be wound on a spool that is coupled to a motor 222 of the UAV (although passive implementations, without a motor, are also possible). The motor may be a DC motor (e.g., a servo motor) that can be actively controlled by a speed controller, although other motor configurations are possible. In some embodiments, the tether control module 216 can control the speed controller to cause the 222 to rotate the spool, thereby unwinding or retracting the tether and lowering or raising the payload coupling apparatus. In practice, a speed controller may output a desired operating rate (e.g., a desired RPM) for the spool, which may correspond to the speed at which the tether system should lower the payload towards the ground. The motor may then rotate the spool so that it maintains the desired operating rate (or within some allowable range of operating rates).

In order to control the motor via a speed controller, the tether control module 216 may receive data from a speed sensor (e.g., an encoder) configured to convert a mechanical position to a representative analog or digital signal. In particular, the speed sensor may include a rotary encoder that may provide information related to rotary position (and/or rotary movement) of a shaft of the motor or the spool coupled to the motor, among other possibilities. Moreover, the speed sensor may take the form of an absolute encoder and/or an incremental encoder, among others. So in an example implementation, as the motor causes rotation of the spool, a rotary encoder may be used to measure this rotation. In doing so, the rotary encoder may be used to convert a rotary position to an analog or digital electronic signal used by the tether control module 216 to determine the amount of rotation of the spool from a fixed reference angle and/or to an analog or digital electronic signal that is representative of a new rotary position, among other options. Other examples are also possible.

In some embodiments, a payload coupling component (e.g., a hook or another type of coupling component) can be configured to secure the payload 228 while being lowered from the UAV by the tether. The coupling apparatus or component and can be further configured to release the payload 228 upon reaching ground level via electrical or electro-mechanical features of the coupling component. The payload coupling component can then be retracted to the UAV by reeling in the tether using the motor.

In some implementations, the payload 228 may be passively released once it is lowered to the ground. For example, a payload coupling component may provide a passive release mechanism, such as one or more swing arms adapted to retract into and extend from a housing. An extended swing arm may form a hook on which the payload 228 may be attached. Upon lowering the release mechanism and the payload 228 to the ground via a tether, a gravitational force as well as a downward inertial force on the release mechanism may cause the payload 228 to detach from the hook allowing the release mechanism to be raised upwards toward the UAV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of the payload 228 no longer forces the swing arm to extend from the housing. Retracting the swing arm into the housing may reduce the likelihood of the release mechanism snagging the payload 228 or other nearby objects when raising the release mechanism toward the UAV upon delivery of the payload 228.

In another implementation, a payload coupling component may include a hook feature that passively releases the payload when the payload contacts the ground. For example, the payload coupling component may take the form of or include a hook feature that is sized and shaped to interact with a corresponding attachment feature (e.g., a handle or hole) on a payload taking the form of a container or tote. The hook may be inserted into the handle or hole of the payload container, such that the weight of the payload keeps the payload container secured$_{[CM1]}$ to the hook feature during flight. However, the hook feature and payload container may be designed such that when the container contacts the ground and is supported from below, the hook feature slides out of the container's attachment feature, thereby passively releasing the payload container. Other passive release configurations are also possible.

Active payload release mechanisms are also possible. For example, sensors such as a barometric pressure based altimeter and/or accelerometers may help to detect the position of the release mechanism (and the payload) relative to the ground. Data from the sensors can be communicated back to the UAS and/or a control system over a wireless link and used to help in determining when the release mechanism has reached ground level (e.g., by detecting a measurement with the accelerometer that is characteristic of ground impact). In other examples, the UAS may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, a UAS 200 could include an air-bag drop system or a parachute drop system. Alternatively, a UAS 200 carrying a payload could simply land on the ground at a delivery location. Other examples are also possible.

IV. ILLUSTRATIVE CAN-BASED COMMUNICATIONS

FIG. 3A is a block diagram of a controller area network (CAN) node included within system 300, according to an example embodiment. In the present example, the CAN node includes CAN controller 302. In the present example, the CAN node may be included as part of a control tier that controls a plurality of modules. CAN controller 302 includes a processor and a computer readable medium. The computer readable medium may have instructions stored thereon, that, when executed by the processor cause CAN controller 302 to perform functions. For instance, the instructions may determine control signals for the CAN node to send to another CAN node within system 300.

CAN controller 302 is connected to other CAN nodes of system 300 via transceivers 306 and 308. In the present example, and throughout the Figures, each transceiver is labelled as an "XCRV." Though transceivers 306 and 308 are depicted as being separate from CAN controller 302, it should be understood that in some embodiments, a CAN controller may include one or more transceivers. Further, though only two transceivers are depicted in the present example, additional transceivers may be connected to the CAN node.

In the present example, transceiver 306 allows for bidirectional communication with other CAN nodes of system 300. That is, CAN controller 302 may receive signals via transceiver 306, and may also transmit signals via transceiver 306. In contrast, transceiver 308 is depicted as permitting unidirectional communication only. For example, CAN controller 302 may be configured to receive signals, and not to transmit signals, via transceiver 308.

In the present example, and throughout the detailed description, reference is made to signals of a CAN-based communication system. It should be readily understood by those having skill in the art that such signals may refer to high speed CAN signals, low speed CAN signals, or other signals that are configured for transmitting information from one CAN node to another. Further, such signals may convey information using base frame format, extended frame format, or any format that includes a structure that allows particular signal sources or types to be identified by a CAN node receiving the signal.

Figure 3B:
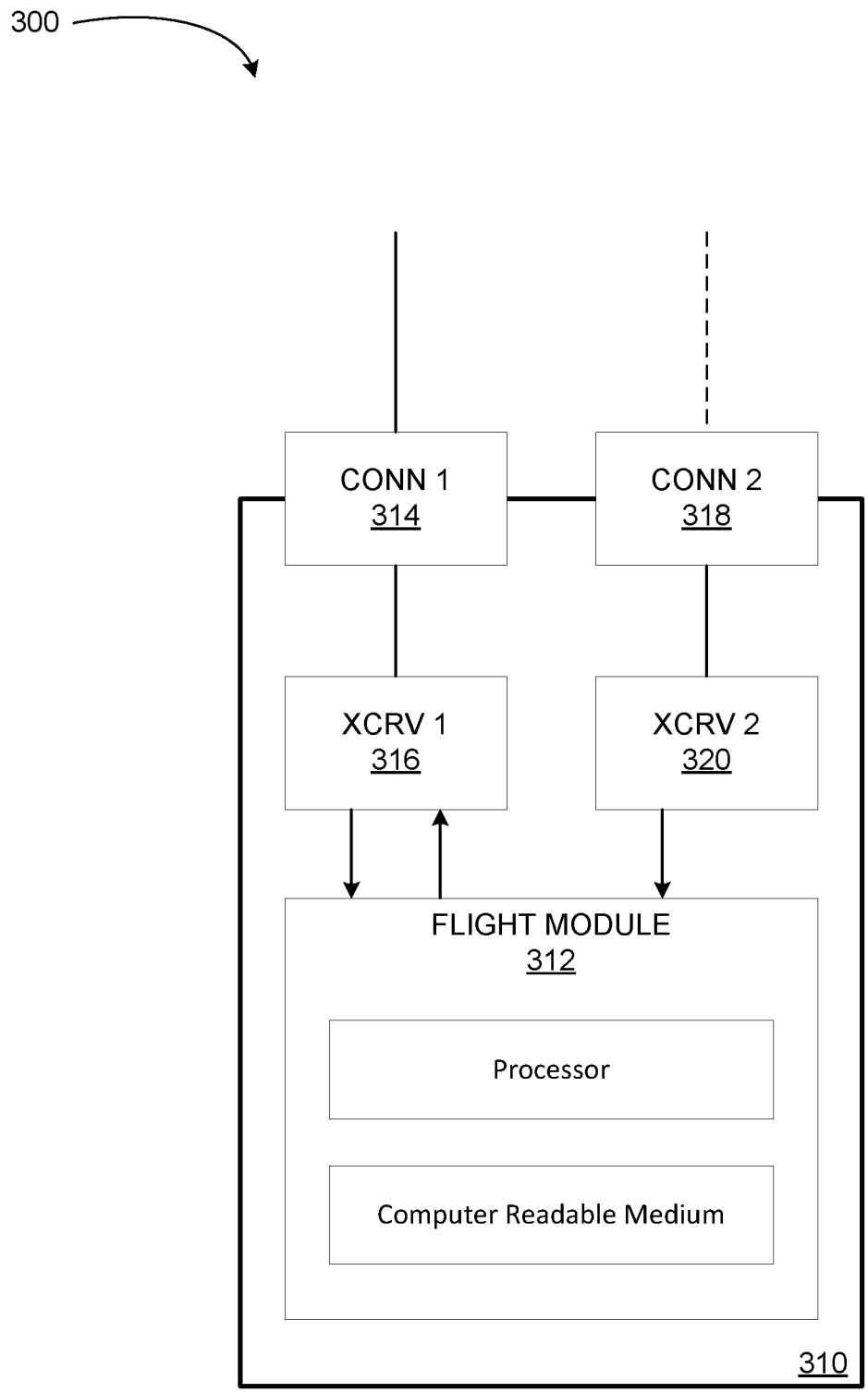
FIG. 3B is a simplified block diagram of another CAN node, according to an example embodiment.

FIG. 3B is a block diagram of another CAN node that may be included within system 300, according to an example embodiment. In the present example, CAN node 310 includes a flight module 312, transceivers 316 and 320, and connectors 314 and 318. Flight module 312 includes a processor and a computer readable medium. The computer readable medium may have instructions stored thereon that cause flight module 312 to perform functions. For instance, the instructions may determine a flight related function to be performed based on signals received by transceivers 316 and 320, and may cause flight module 312 to perform that function. A flight related function may include obtaining from and/or sending sensor data to another CAN node of system 300. In other examples, the flight related function may include operating a sensor, actuator, motor, servo, propeller, communication terminal, or other controllable element of an aerial vehicle. In some examples, the signals received at the transceivers may include control signals sent from a CAN controller, such as CAN controller 302 described above with regard to FIG. 3A. The signals also may include signals sent by other flight modules within system 300.

Flight modules within system 300, such as flight module 312, may control or include motors, servos, air sensors, weather sensors, global positioning system (GPS) sensors, battery systems, package systems, or other components of an aerial vehicle. Some of these may perform functions that are critical to flight of the aerial vehicle. For instance, motors, servos, and air sensors of the system may be necessary for an aerial vehicle to remain in flight. Flight modules that control, or that include such components of an aerial vehicle may be referred to as "flight-critical modules." Other flight modules may not be necessary for flight. For instance, indicator lights may not be strictly necessary for an aerial vehicle to remain airborne. Flight modules that control, or that include such components may be referred to as "non-flight-critical modules."

In some examples, certain flight-critical modules may perform functions that are redundant to functions performed by other flight-critical modules. In this way, should a flight-critical module fail, another module may perform the same functions and keep the aerial vehicle airborne, or cause the aerial vehicle to operate as it normally would. Alternatively, a module that performs redundant functions may cause the aerial vehicle to land safely.

Figure 4:
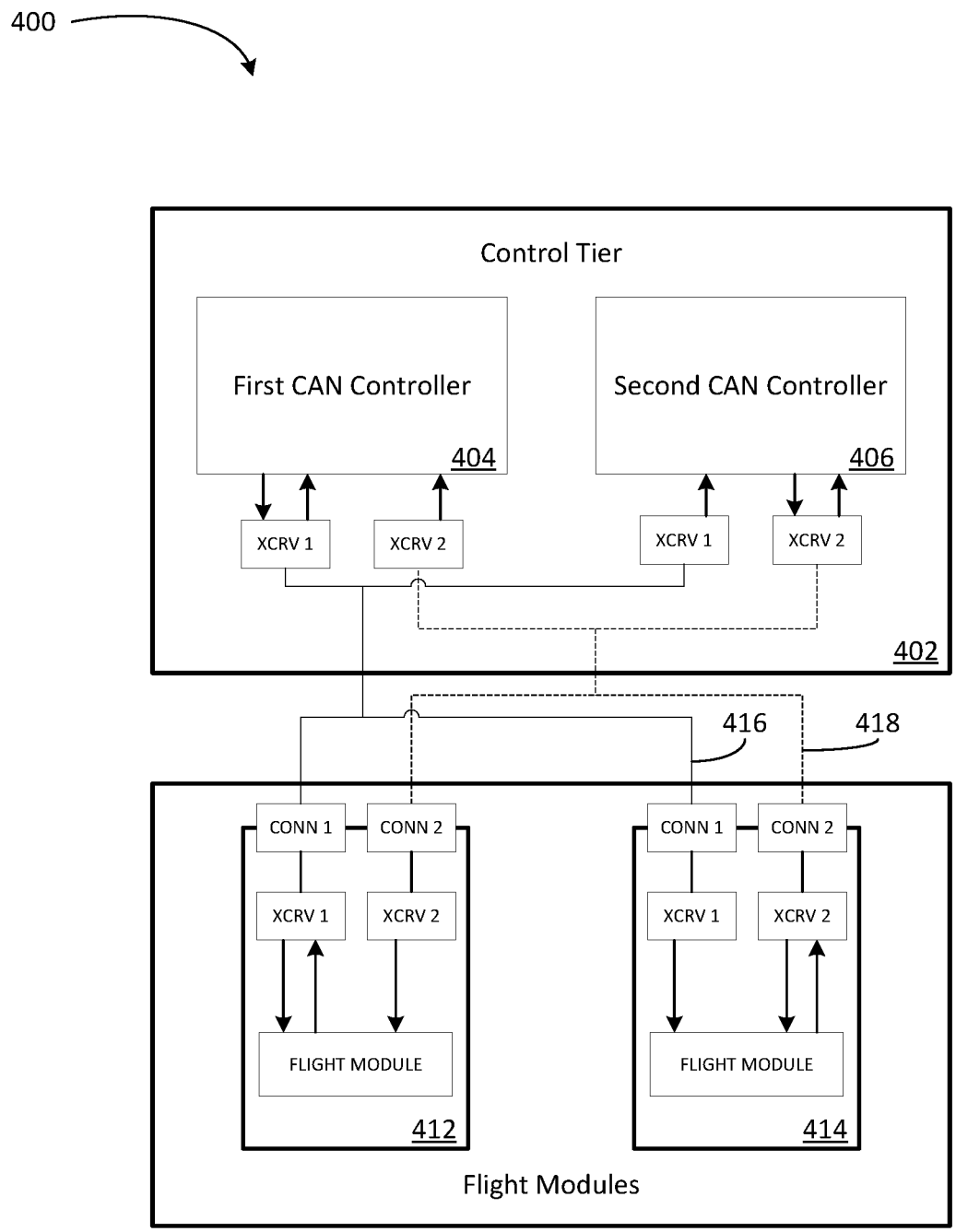
FIG. 4 is a simplified block diagram of a CAN communication system, according to an example embodiment.

FIG. 4 is a simplified block diagram of a CAN-based communication system 400, according to an example embodiment. System 400 includes CAN nodes that form a control tier 402 and a plurality of flight modules. The control tier includes a first CAN controller 404 and a second CAN controller 406. System 400 additionally includes CAN buses 416 and 418 that connect CAN controllers 404 and 408 to flight modules 412 and 414.

In the present example, first CAN controller 404 is configured to control either, or both, of flight modules 412 and 414 depending on an operational state of system 400. For instance, in a normal operating state, first CAN controller 404 may be configured to exclusively control flight module 412 via CAN bus 416, though CAN bus 418 may transmit signals from first CAN controller 404 to flight module 414 during the normal operating state. During the normal operational state, though flight module 414 may receive control signals from both of CAN controllers 404 and 406, flight module 414 may be configured to perform functions in response only to control signals received from second CAN controller 406. Likewise, during the normal operational state, flight module 412 may be configured to perform functions only in response to receiving control signals from first CAN controller 404.

In the present example, flight module 412 is configured to send flight signals via CAN bus 416, but not via CAN bus 418, and flight module 414 is configured to send flight signals via CAN bus 418, but not via CAN bus 416. However, CAN controllers 404 and 406 may receive flight signals from both flight modules 412 and 414 because both CAN controllers are connected to both CAN buses. In this way, even if a CAN controller fails, the other CAN controller may be able to receive flight signals from both of flight modules 412 and 414.

As described above with regard to FIG. 3B, some flight modules may perform functions redundant to other flight modules. In the present example, flight module 414 may perform functions redundant to those performed by flight module 412. Accordingly, flight module 412 may be referred to as a primary flight module, and flight module 414 may be referred to as secondary flight module. In this fashion, system 400 may have multiple points of redundancy. Second CAN controller 406 may control flight modules 412 and 414 if first CAN controller 404 fails, and secondary flight module 414 may continue to perform functions if primary flight module 412 fails. Additional example embodiments are described below that explain various contexts in which a CAN-based communication system may operate.

In the present example, and in following examples, various CAN nodes of the system are connected asymmetrically. That is, the CAN nodes are connected such that they can receive and send signals via one CAN bus, but can only receive signals from another CAN bus. For instance, flight module 412 can send and receive signals via CAN bus 416, but can only receive signals via CAN bus 418. Similarly, flight module 414 can send and receive signals via CAN bus 418, but can only receive signals via CAN bus 416. CAN controllers 404 and 406 are similarly connected to CAN buses 416 and 418. In this fashion, should a CAN node fails such that it continually sends signals over one CAN bus and drown out or interfere with other signals on that CAN bus, another CAN bus can continue to transfer signals among the CAN nodes.

Figure 5A:
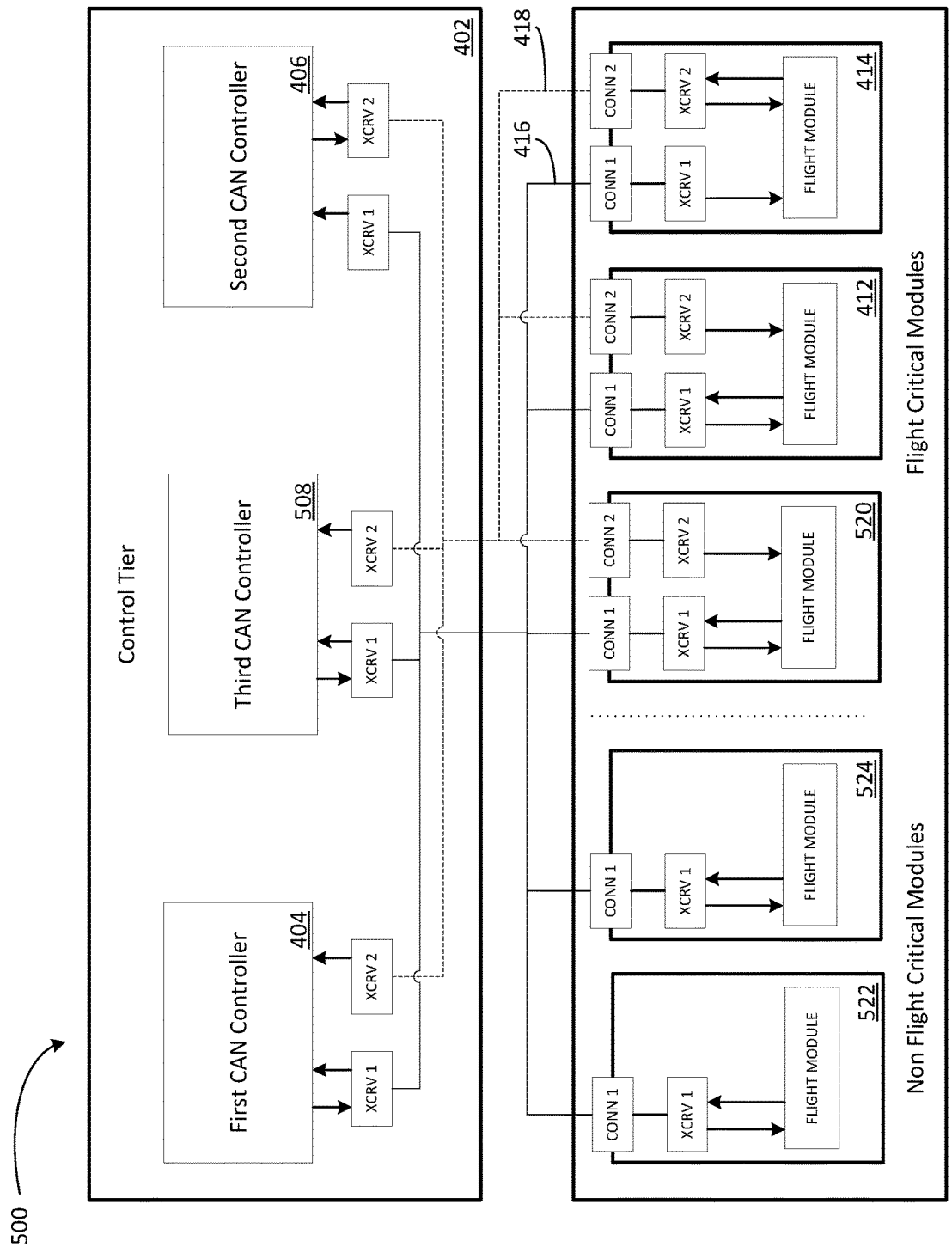
FIG. 5A is a simplified block diagram of another CAN communication system, according to another example embodiment.

FIG. 5A is a simplified block diagram of a CAN-based communication system 500, according to an example embodiment. System 500 includes a control tier 402 and a plurality of flight modules. Control tier 402 includes CAN controllers 404 and 406 described above with regard to FIG. 4, and additionally includes CAN controller 508. The flight modules include non-flight-critical modules 522 and 524 and flight-critical modules 520, and modules 412 and 414 described above with regard to FIG. 4. Though only three CAN controllers and five flight modules are depicted in FIG. 5, it should be readily understood by those having skill in the art that additional controllers or modules may be included within system 500.

System 500 additionally includes CAN buses 416 and 418 described above with regard to FIG. 4. In the present example, CAN bus 416 connects each of CAN controllers 404, 508, and 406, and flight modules 522, 524, 520, 416, and 418. CAN bus 418, connects each of CAN controllers 404, 508, and 406, and flight modules 520, 412, 414, and 524, but is not connected to non-flight-critical module 522. Thus, CAN bus 418 may have fewer potential points of failure than CAN bus 416. For example, flight module 522 may fail such that it floods CAN bus 416 with signals that make it difficult for other CAN nodes of the system to interpret signals within system 500. However, such a failure would not affect the operation of CAN bus 418, and flight modules 520, 524, 412, and 414 may operate based on signals received from CAN bus 418 rather than those received from CAN bus 416.

Though, in the present example, flight module 522 is depicted as only receiving control signals via CAN bus 416, it should be understood that each and every flight module may be connected to each CAN bus of the system. In other examples, several flight modules may only be connected to one CAN bus, but not another. In still other examples, each non-flight-critical module may be configured in the same fashion as module 424, which is configured to receive signals via both CAN bus 416 and CAN bus 418, but only to send flight signals via CAN bus 416. Other configurations of the flight modules are possible as well.

Figure 5B:
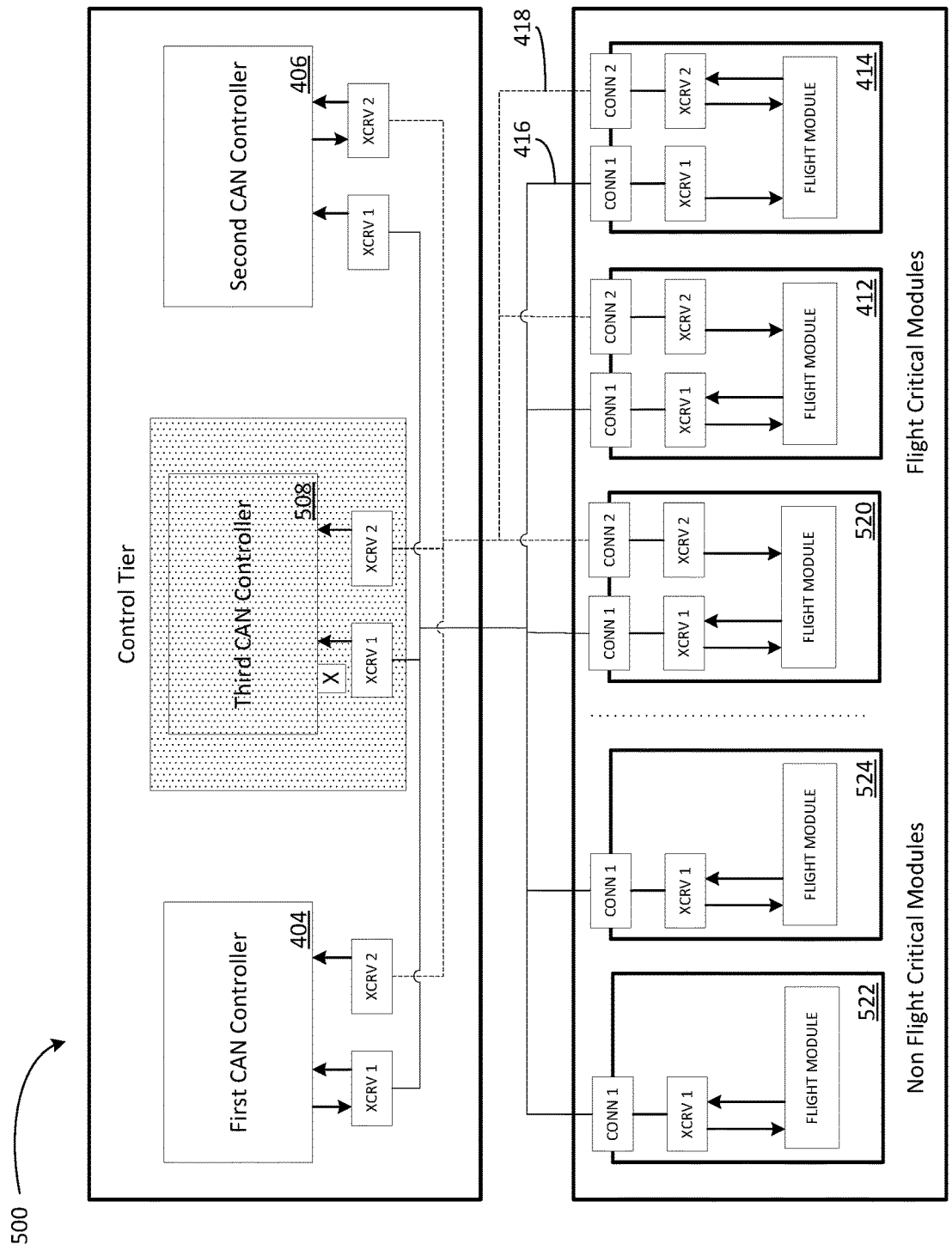
FIGS. 5B, 5C, 5D, 5E, and 5F are simplified diagrams of a CAN communication system in various failure states, according to example embodiments.

FIG. 5B is a simplified block diagram of a CAN-based communication system 500 where a CAN controller has failed. In the present example, CAN controller 508 has experienced a failure. Failure of a CAN controller may include a failed transceiver or a failed processor, though other types of failure are possible. In the present example, CAN controller 508 has failed such that it cannot send control signals.

In a normal operating state of system 500, CAN controller 404 and CAN controller 508 may operate primarily on CAN bus 416. That is, they both may receive and send signals via CAN bus 416, while only receiving signals via CAN bus 418. Because there are two CAN controllers operating primarily on CAN bus 416, they may coordinate signals to control the flight modules. For instance, some flight modules of the plurality of flight modules may place a higher priority on control signals sent from CAN controller 404, while other flight modules may place a higher priority on control signals sent from CAN controller 508. In other examples, CAN controller 404 may send a predefined set of control signals, while CAN controller 508 may send another predefined set of control signals. In additional examples, CAN controller 404 may only send control signals for controlling certain flight modules, such as modules 520 and 412, while CAN controller 508 may only send control signals for controlling other flight modules, such as modules 522 and 524. In still other examples, flight modules may convert commands received from both CAN controller 404 and 508 into a single actionable command. In these examples, the flight modules may use a Mid Value Select algorithm to combine these commands, though other algorithms are possible as well.

In the present example, system 500 has experienced a failure state, because CAN controller 508 cannot transmit control signals to the flight modules. However, because CAN controller 404 operates on CAN 416, CAN controller 404 may control each flight module as if CAN controller 508 was operating normally. For instance, CAN controller 404, responsive to determining the failure state of CAN controller 508, may send additional control signals that CAN controller 508 would normally send. In other examples, CAN controller may alter its control signals to control each of the flight modules. In still other examples, the flight modules may determine the failure state of CAN controller 508, and responsive to determining the failure state of CAN controller 508, may place a higher priority on control signals received from CAN controller 404. In this fashion, system 500 may provide an additional redundancy to system 400 described above with regard to FIG. 4.

Determining the failure state of CAN controller 508 may include receiving, by a CAN node of system 500, such as CAN controller 404 or one of flight modules 522, 524, 520, 412, or 414, that CAN controller 508 has not sent a control signal in a certain period of time. For instance, if CAN controller 508 does not send a control signal for a period meeting or exceeding a control signal waiting threshold, CAN controller 404 may begin to control the flight modules previously controlled by CAN controller 508, as if CAN controller 508 was operating normally. Other ways of determining a failure state of a CAN node are possible as well.

Figure 5C:
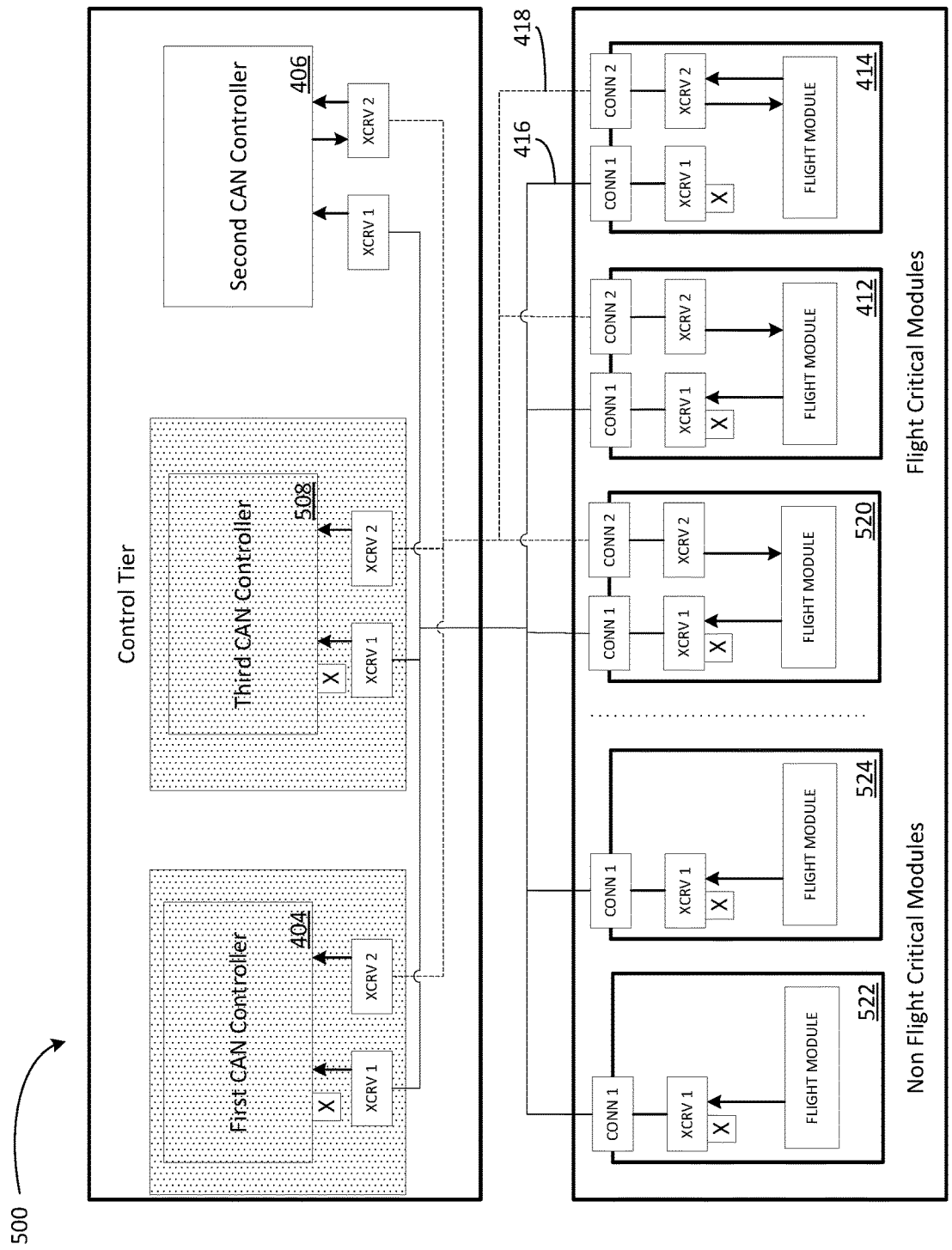

FIG. 5C is a simplified block diagram of a CAN-based communication system 500 where two CAN controllers have failed. In the present example, CAN controllers 404 and 508 have failed. That is, neither CAN controller 404 nor CAN controller 508 can transmit control signals to the flight modules. Because CAN controllers 404 and 508 have failed such that neither can send control signals, flight modules 520, 412, and 414 may only receive control signals from CAN controller 406, and flight module 522 may not receive any control signals at all. The flight modules may individually, or collectively, determine the failure state of CAN controllers 404 and 508. In other examples another CAN controller of system 500 may determine the failure state of another CAN controller. In the present example, CAN controller 406 may determine the failure state of CAN controllers 404 and 508.

Responsive to determining the failure state, CAN controller 406 may send control signals to flight modules 520, 412, and 414 via CAN bus 418 such that CAN controller 406 controls flight modules 520, 412, and 414. In some examples, CAN controller 406 may send additional control signals in response to determining the failure state. Such additional control signals may indicate to flight modules 520, 412 and 414 that they should follow control signals received over CAN bus 418. For instance, the additional control signals may have a higher priority level than those sent prior to determining the failure state of CAN controllers 404 and 508. In other examples, the control signals may indicate the failure state of CAN controllers 404 and 508 to the flight modules, and the flight modules may individually determine to perform functions in response to receiving the control signals from CAN controller 406. In still other examples, the additional control signals may remain unchanged, and the flight modules may determine the failure state.

In the present example, flight modules 522 and 524 do not receive any control signals from CAN controllers 404 and 406. Flight modules 522 and 524 may be configured to individually or collectively determine that no signals are being received. Responsive to determining a lack of control signals received, both of flight modules 522 and 524 may revert to a default operating state. In the default operating state, flight modules 522 and 524 may rely on instructions stored on memory associated with the flight modules. For instance, in examples where flight modules 522 and 524 include flight sensors, the instructions may be executed by processors associated with flight modules 522 and 524 to cause the flight modules to continue sending flight sensor data despite a lack of received control signals. Each flight flight module of system 500 may similarly operate in a default operating state based on a context of system 500.

In the present example, though CAN controllers 404 and 508 have failed, the flight modules may continue to transmit signals over CAN bus 416. For instance, one or more of flight modules 520, 412, or 414 may act as relays between CAN controller 406 and flight module 522. Further, flight modules 522, 524, 520, and 412 may continue to transmit flight signals to CAN controller 406 via CAN bus 416. CAN controller 406 may use the flight signals received from the flight modules to determine control signals to send to the flight modules via CAN bus 418.

Though in the present example CAN controllers 404 and 508 are depicted as being unable to transmit control signals over CAN bus 416, a failure state of a CAN controller of system 500 may include an inability to receive signals. For instance, a transceiver associated with CAN controller 404 may fail such that CAN controller 404 cannot receive signals via CAN bus 416. CAN controller 404 may send signals indicative of its inability to receive signals via CAN bus 416 to other CAN nodes of system 500. Responsive to receiving such signals, another CAN controller, such as CAN controller 406, or a flight module, such as flight module 414 may act as a relay and send signals to CAN controller 404 via CAN bus 418.

Figure 5D:
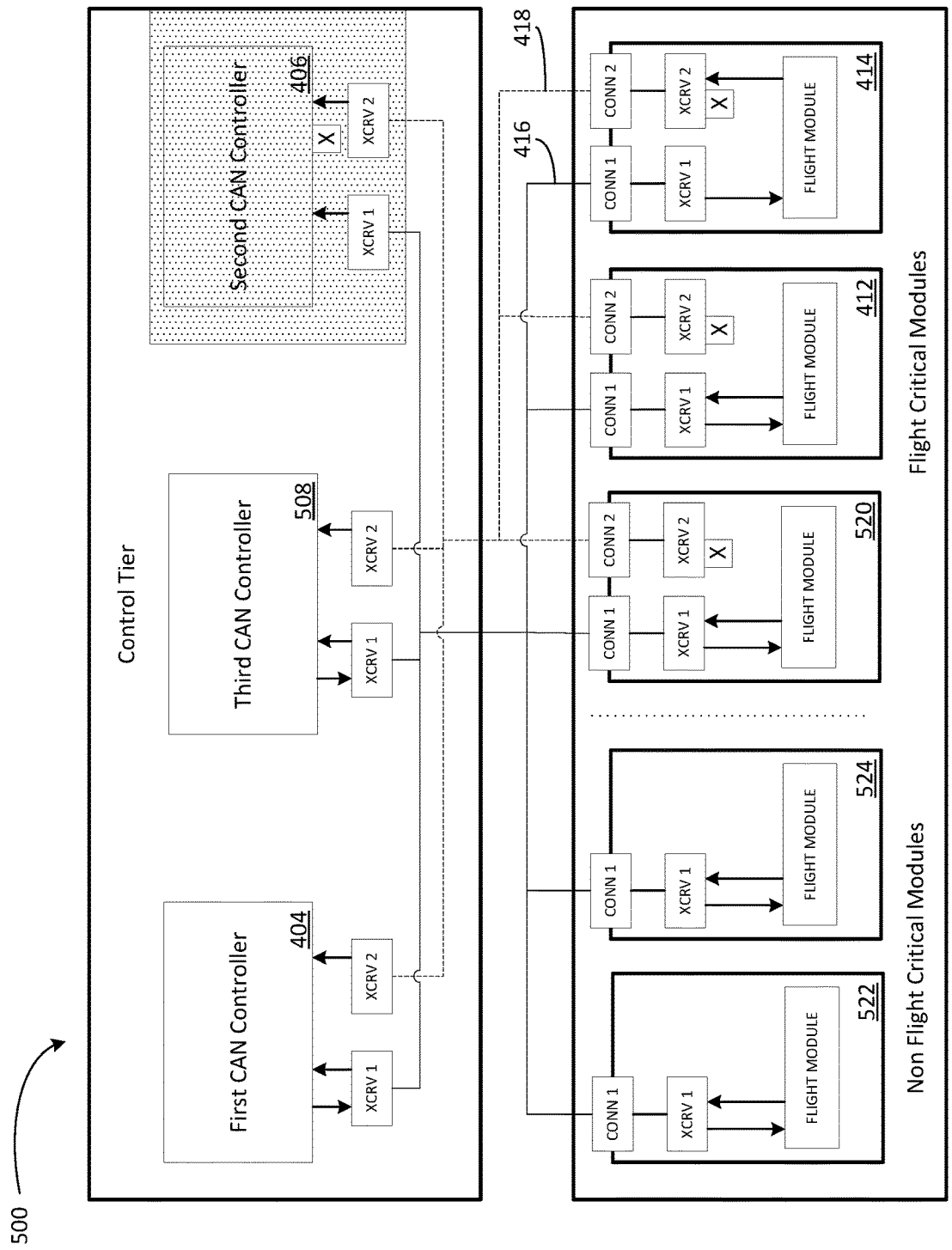

FIG. 5D is a simplified block diagram of a CAN-based communication system 500 where a CAN controller has failed. In the present example, CAN controller 406 has experienced a failure such that it cannot transmit control signals via CAN bus 418. In the present example, CAN controllers 404 and 508 may operate normally, such that they can send and receive signals via CAN bus 416, while receiving other signals via CAN bus 418. As such, non-flight-critical module 522 may operate normally since it only operates on CAN bus 416, and flight-critical modules 520 and 412 may operate normally as well, since they are configured to perform functions responsive to signals received via CAN bus 416.

Responsive to determining the failure state of CAN controller 406, CAN controller 404, CAN controller 508, or both may send additional control signals for controlling flight module 414. Flight module 414 may continue to send flight signals via CAN bus 418, and CAN controllers 404 and 508 may receive the flight signals. In other examples, CAN controllers 404 and 508 might not send additional signals. Rather, because flight module 414 may perform functions redundant to those performed by flight module 412, flight module 414 may simply perform functions responsive to receiving control signals received via CAN bus 416 that were directed to flight module 412.

Figure 5E:
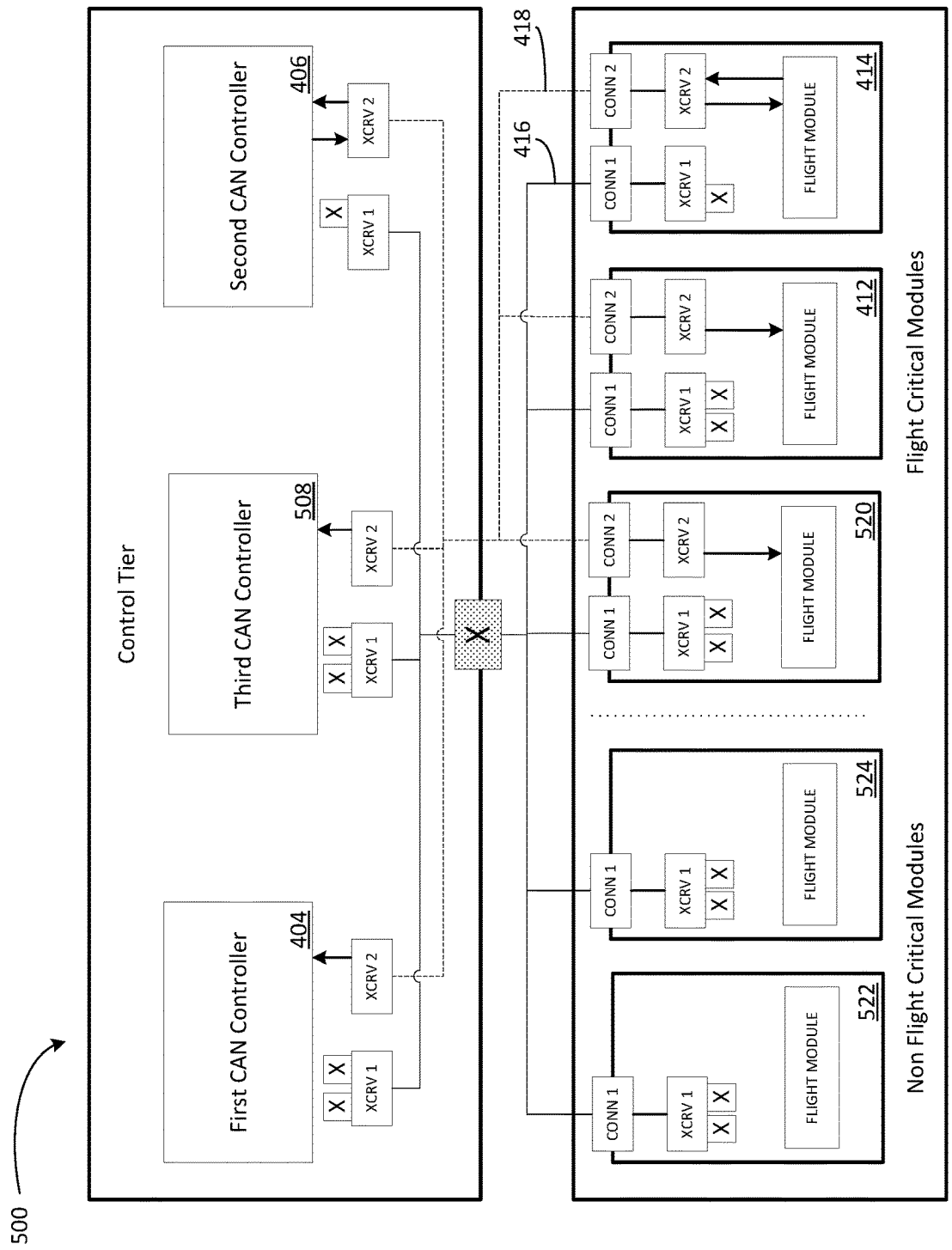

FIG. 5E is a simplified block diagram of a CAN-based communication system 500 where a CAN bus has failed. In the present example, CAN bus 416 has failed such that no CAN nodes of system 500 can send or receive signals via CAN bus 416. As a result, CAN controllers 404 and 508 cannot send control signals, non-flight-critical module 522 cannot receive or send signals, and flight modules 520, 522, and 412 can only receive signals via CAN bus 418, but cannot send signals. In the present example, only flight module 414 may operate normally. As such, it may be necessary for an aerial vehicle associated with system 500 to land.

CAN controller 406 may determine the failure state of CAN bus 416 by determining that it has not received any signals via CAN bus 416 within a signal waiting threshold time. Responsive to determining the failure state, CAN controller 406 may send control signals to flight modules 520 and 412. Because CAN controllers of system 500 may determine control signals based on signals, such as sensory signals, received from the flight modules, the control signals may simply instruct the flight modules to perform a predefined action. For instance, the control signals may instruct the flight modules to perform landing functions.

Figure 5F:
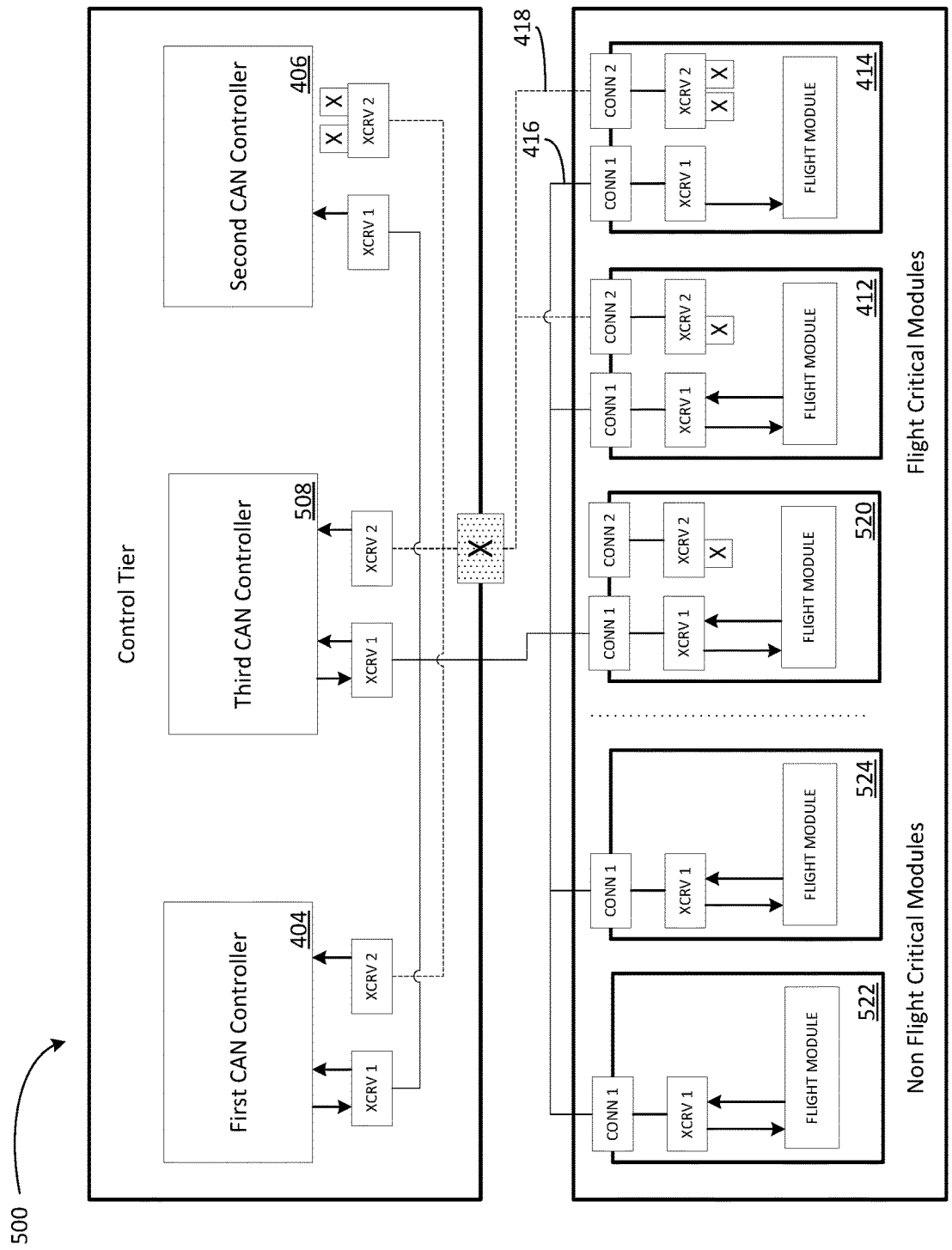

FIG. 5F is a simplified block diagram of a CAN-based communication system 500 where a CAN bus has failed. In the present example, CAN bus 418 has failed such that no CAN nodes of system 500 can send or receive signals via CAN bus 418. As a result, CAN controller 406 cannot send control signals, and flight module 414 can only receive signals via CAN bus 418. In the present example, CAN controllers 404 and 508, and flight modules 522, 524, 520, and 412 may operate normally.

CAN controller 404, CAN controller 508, or both may determine the failure state of CAN bus 418 by determining that they have not received any signals via CAN bus 418 within a signal waiting threshold time. Responsive to determining the failure state, CAN controllers 404 and 508 may send control signals to flight module 414. Because CAN controllers of system 500 may determine control signals based on signals, such as sensory signals, received from the flight modules, the control signals may be based on signals received from flight modules 522, 524, 520, and/or 412. Because more CAN controllers and flight modules may primarily operate on CAN bus 416 than on CAN bus 418, an aerial vehicle associated with system 500 may continue to operate despite the failure of CAN bus 416.

Though only one set of redundant flight modules (flight modules 412 and 414) are depicted in FIG. 4-5F, it should be understood that several flight modules may perform functions redundant to those performed by other flight modules in the system. For instance, system 500 may include an additional flight module that performs functions redundant to those performed by flight module 520. As such, even where a CAN bus, such as CAN bus 416, has failed, an aerial vehicle associated with system 500 may remain airborne, or even operate normally. A CAN controller may nonetheless send control signals configured to mitigate risks associated with additional failures in system 500, such as control signals that cause the flight modules to land an aerial vehicle.

Figure 6:
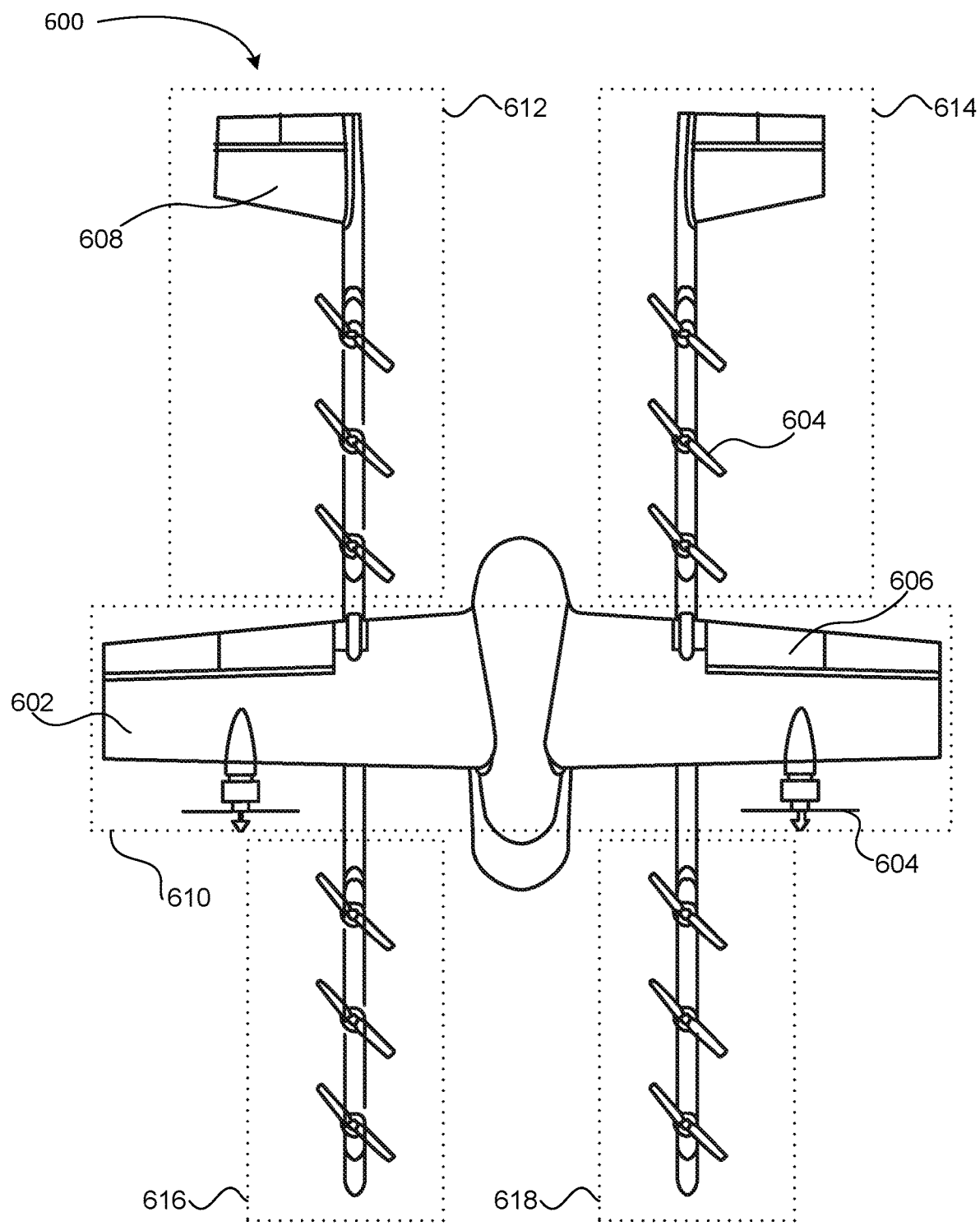
FIG. 6 is a simplified illustration of an aerial vehicle, according to an example embodiment.

FIG. 6 is a top down view of an aerial vehicle 600, according to an example embodiment. In the present example, aerial vehicle 600 includes control zones 610, 612, 614, 616, and 618. Control zone 610 includes a wing 602 having a plurality of propellers 604 and a plurality of ailerons 606. Control zones 616 and 618 each include a plurality of propellers 604, and control zones 608 and 614 each include a plurality of propellers 604 and a stabilizer 608. These components may be associated with CAN nodes of a CAN-based communication system of aerial vehicle 600. For example, each control zone may include one or more CAN nodes of system 500 described above with regard to FIGS. 5A-5F. Because propellers, ailerons, and stabilizers may directly influence whether aerial vehicle 600 can remain airborne, such components may be controlled by flight-critical modules of the CAN-based communication system.

In some examples, in response to determining one or more detected failure states of the system, the CAN-based communication may cause aerial vehicle 600 to perform an action. For instance, the system may cause aerial vehicle 600 to land. In other examples, the system may cause aerial vehicle 600 to return to a home base. In still other examples, the system may cause aerial vehicle 600 to unload a package carried by the aerial vehicle before landing or returning to a home base. Other actions are possible as well.

As described above with regard to FIGS. 5A-5F, certain failure states of the CAN-based communication system may prevent flight-critical modules from sending or receiving signals. Flight modules may independently fail as well. For instance, one or more of propellers 604 of aerial vehicle 600 may fail.

In an example scenario, a flight module associated with control zone 614 may fail. Due to the failure, one or more of the propellers of control zone 614 may cease to operate, creating a pitching moment about a central axis of aerial vehicle 600.

One or more CAN nodes of the system may determine the failure state of the flight module. For example, a CAN controller may determine that the flight module has stopped sending signals, and thereby determine the failure state. In other examples, a sensor may determine the failure. For instance, an orientation sensor may determine that aerial vehicle 600 is tilting towards the inoperable propellers of control zone 614. In response, one or more CAN controllers may send control signals to flight modules associated with control zones 610, 612, 616, and 618 that instruct the flight modules to compensate for the inoperable propellers and to slowly descend the aerial vehicle for landing. In other example scenarios, a redundant flight module may be instructed to take up control of control zone 614.

Determining a flight related function to perform in response to determining a failure state of aerial vehicle 600 may depend on which component has experienced a failure state, and a likelihood of other components of failing. For instance, one or more CAN controllers may determine a statistical failure likelihood metric, and control aerial vehicle 600 to continue performing tasks so long as the determined failure likelihood metric remains below a first failure likelihood threshold, and may control aerial vehicle 600 to land if the failure likelihood metric meets or exceeds the threshold. Different actions may be based on different failure likelihood thresholds. For instance, returning to a home base may be associated with a second threshold, and dropping off a package carried by the aerial vehicle may be associated with a third threshold. Other actions and thresholds are possible as well.

Calculating the failure likelihood metric may be based on a failure likelihood associated with existing components of aerial vehicle 600. For instance, an object avoidance sensor may have a likelihood of failing one time in one thousand flight hours, a CAN bus may have a likelihood of failing once in five hundred thousand flight hours, and a CAN controller may have a likelihood of failing once in twenty thousand flight hours. Other components may have other failure likelihoods. The failure likelihood metric may be based on each of these values, and may be adjusted if one component fails. For instance, if a flight module fails, the failure likelihood metric may be adjusted to reflect that the flight module has failed. The metric may additionally weigh various components differently than others. For instance, a CAN bus may be weighted more by the metric than a CAN controller, which may be weighted more than a flight-critical module, which may be weighted more than a non-flight-critical module. Redundant components may be weighted differently as well. For example, a flight module being triple redundant may be weighted less than a flight module being double redundant. Other ways of calculating the failure likelihood metric are possible as well.

Figure 7:
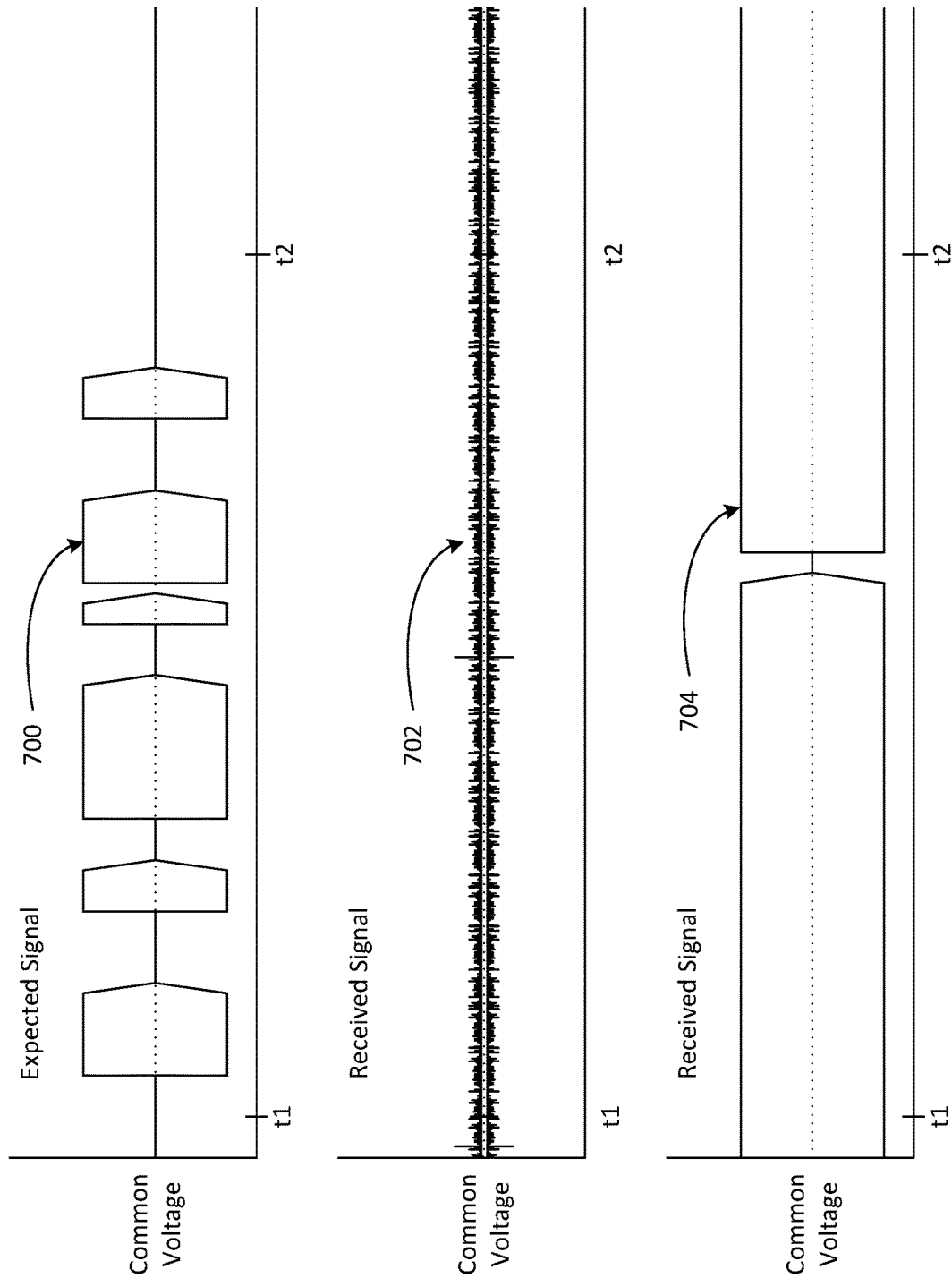
FIG. 7 is a simplified illustration of signals received by a CAN node, according to an example embodiment.

FIG. 7 illustrates a plurality of signals, according to example embodiments. As described above, determining a failure state of a CAN controller or a flight module may include receiving signals from a CAN bus and analyzing the received signal. For instance, a CAN controller may expect to receive a signal 700 between times t1 and t2. The expected signal, for example, may specify an identifier of a particular flight module or a particular message identifier.

Instead, the CAN controller may receive a signal such as signal 702 that simply includes noise centered on a common voltage of the CAN-based communication system. In other examples, the CAN controller may receive a signal, such as signal 704, which deviates from the expected signal. In either case, the CAN controller may determine that the flight module has experienced a failure state, and respond as detailed above.

It should be understood that, though the signals 700 and 704 depict high speed CAN signaling, low speed CAN signaling, or other types of signaling may be used as well.

Figure 8:
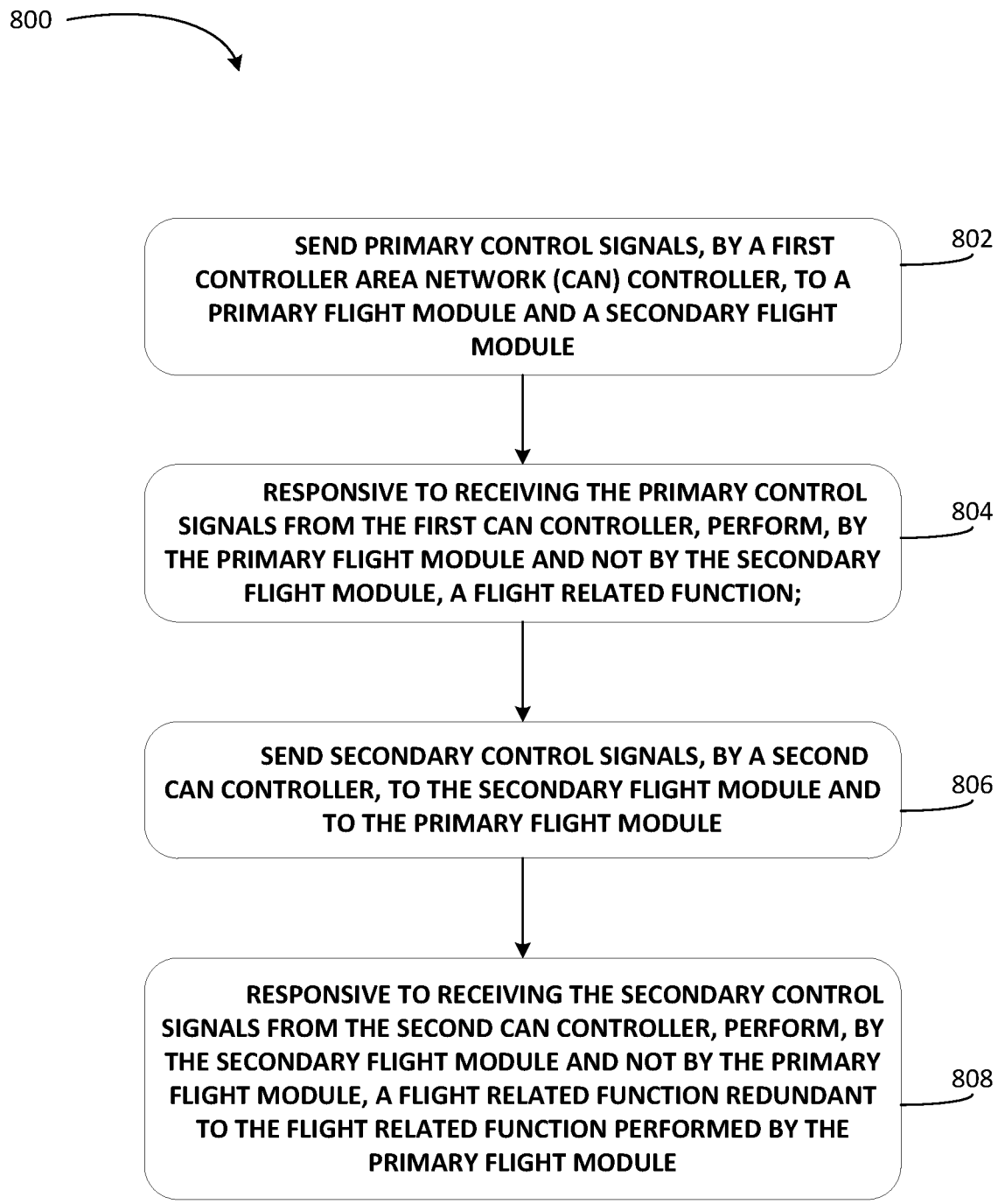
FIG. 8 is a simplified block diagram of a method, according to an example embodiment.

FIG. 8 is a flowchart illustrating an example method 800. The method illustrated by FIG. 8 may be carried out by any of the systems described above with regard to FIGS. 3-6.

In addition, for the method shown in FIG. 8 and other processes and methods disclosed herein, the flowchart shows functionality and operation of one possible implementation of present embodiments. In this regard, some blocks may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method and other processes and methods disclosed herein, each block in FIG. 8 may represent circuitry that is wired to perform the specific logical functions in the process.

Block 802 may be performed to send primary control signals, by a first CAN controller such as CAN controller 404, to a primary flight module and a secondary flight module such as flight modules 412 and 414.

Block 804 may be performed to, responsive to receiving the primary control signals from the first CAN controller, perform, by the primary flight module and not by the secondary flight module, a flight related function.

Block 806 may be performed to send secondary control signals, by a second CAN controller such as CAN controller 406, to the secondary flight module and to the primary flight module.

Block 808 may be performed to, responsive to receiving the secondary control signals from the second CAN controller, perform, by the secondary flight module and not by the primary flight module, a flight related function redundant to the flight related function performed by the primary flight module.

In some embodiments, method 800 may also include receiving, by the first CAN controller, flight signals from the primary flight module and from the secondary flight module. The method may further include determining, by the first CAN controller additional primary control signals based on the received flight signals. The method may additionally include receiving, by the second CAN controller, flight signals from the secondary flight module and from the primary flight module. The method may still further include determining, by the second CAN controller additional secondary control signals based on the received flight signals.

In these embodiments, during a normal operating state, the first CAN controller may determine the additional primary control signals based on the flight signals received from the primary flight module and not based on the flight signals received from the secondary flight module. Further, during the normal operating state, the second CAN controller may determine the additional secondary control signals based on the flight signals received from the secondary flight module and not based on the flight signals received from the primary flight module.

In some embodiments, method 800 may also include determining a failure state of the primary flight module. The method may further include, responsive to determining the failure state of the primary flight module, determining, by the first CAN controller and the second CAN controller, additional control signals based on the flight signals received from the secondary flight module and not based on the flight signals received from the primary flight module.

In some embodiments, method 800 may also include sending, by a third CAN controller such as CAN controller 508, tertiary control signals to the primary flight module, wherein the tertiary control signals are redundant to the primary control signals sent by the first CAN controller. The method may further include determining a failure state of the first CAN controller. Determining the failure state of the first CAN controller may include determining that the first CAN controller has stopped sending the primary control signals. The method may additionally include, responsive to determining the failure state of the first CAN controller, altering, by the third CAN controller, the tertiary control signals such that the primary flight module continues to perform flight tasks as if the first CAN controller was still sending the primary control signals.

In some embodiments, the primary and secondary flight modules may be included within a plurality of flight-critical modules. In these embodiments, method 800 may further include determining a failure state of a non-flight-critical module. The method may also include, responsive to determining the failure state of the non-flight-critical module, continuing to send, by the first CAN controller and the second CAN controller, the primary control signals and the secondary control signals respectively.

In some embodiments, method 800 may also include determining a failure state of a first CAN bus configured to transmit the primary control signals from the first CAN controller to the primary flight module. The method may further include, responsive to determining the failure state of the first CAN bus, performing, by the primary flight module, flight related functions based on control signals sent by the second CAN controller via a second CAN bus.

V. CONCLUSION

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures.

Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

Herein, the term flight operation includes any operation or flight related function performed by an aerial vehicle or system, including actions performed by any sensor, actuator, processor, module, or component of the aerial vehicle or system, during flight, or directly proceeding or following flight of the aerial vehicle or system.

We claim:

1. A method, comprising:
   determining a statistical failure likelihood metric for an aerial vehicle based on a plurality of failure likelihoods, wherein each respective failure likelihood of the plurality of failure likelihoods represents a probability that a corresponding controller area network (CAN) node of a plurality of CAN nodes of the aerial vehicle will fail within a given timeframe of the aerial vehicle, and wherein determining the statistical failure likelihood metric comprises, based on a first CAN node of the plurality of CAN nodes being at least double redundant, weighting a respective failure likelihood of the first CAN node differently from a respective failure likelihood of a non-redundant CAN node of the plurality of CAN nodes;
   performing an action of the aerial vehicle in accordance with the statistical failure likelihood metric;
   sending signals, by the first CAN node, via a CAN bus connected to the plurality of CAN nodes;
   determining, by a second CAN node of the plurality of CAN nodes, a failure state of the first CAN node based on receiving the signals sent by the first CAN node;
   adjusting the statistical failure likelihood metric for the aerial vehicle based on determining the failure state of the first CAN node, wherein the adjusted statistical failure likelihood metric is indicative of a reduction in redundancy associated with the first CAN node caused by the failure state of the first CAN node;
   determining that the adjusted statistical failure likelihood metric for the aerial vehicle meets or exceeds a failure likelihood threshold; and
   responsive to determining that the adjusted statistical failure likelihood metric for the aerial vehicle meets or exceeds the failure likelihood threshold, changing, by a CAN controller, the action of the aerial vehicle.

2. The method of claim 1, wherein determining the statistical failure likelihood metric comprises determining the statistical failure likelihood metric based on failure likelihoods of a plurality of components of the aerial vehicle that are associated with the plurality of CAN nodes.

3. The method of claim 2, further comprising:
   determining the failure likelihoods of the plurality of components of the aerial vehicle based on a number of flights associated with each of the plurality of components.

4. The method of claim 1, further comprising:
   determining a type of component of the aerial vehicle corresponding to the first CAN node, wherein determining the adjusted statistical failure likelihood metric comprises determining the adjusted statistical failure likelihood metric based on the type of component corresponding to the first CAN node.

5. The method of claim 4, wherein determining the adjusted statistical failure likelihood metric based on the type of component corresponding to the first CAN node comprises determining the adjusted statistical failure likelihood metric based on whether the first CAN node is a flight-critical flight module.

6. The method of claim 4, wherein the first CAN node is triple redundant before experiencing the failure state of the first CAN node, and wherein determining the adjusted statistical failure likelihood metric based on the type of component corresponding to the first CAN node comprises determining the adjusted statistical failure likelihood metric based on determining that the redundancy associated with the first CAN node is reduced to double redundancy after experiencing the failure state of the first CAN node.

7. The method of claim 6, wherein determining the adjusted statistical failure likelihood metric based on determining that the redundancy associated with the first CAN node is reduced to double redundancy after experiencing the failure state of the first CAN node comprises weighting the first CAN node more in determining the adjusted statistical failure likelihood metric than in determining the statistical failure likelihood metric based on determining that the first CAN node was triple redundant before experiencing the failure state of the first CAN node and is associated with double redundancy after experiencing the failure state of the first CAN node.

8. The method of claim 1, wherein the failure likelihood threshold is one of a plurality of failure likelihood thresholds, wherein each failure likelihood threshold of the plurality of failure likelihood thresholds corresponds to a different action of the aerial vehicle, and wherein changing the action of the aerial vehicle comprises changing the action of the aerial vehicle based on which of the plurality of failure likelihood thresholds the adjusted statistical failure likelihood metric meets or exceeds.

9. The method of claim 8, wherein changing the action of the aerial vehicle comprises causing the aerial vehicle to land.

10. The method of claim 8, wherein the action of the aerial vehicle comprises causing the aerial vehicle to return to a home base.

11. A system, comprising:
an aerial vehicle;
a plurality of controller area network (CAN) nodes comprising a first CAN node and a second CAN node;
a plurality of processors;
a non-transitory computer readable medium; and
program instructions stored on the non-transitory computer readable medium and executable by the plurality of processors to:
determine a statistical failure likelihood metric for the aerial vehicle based on a plurality of failure likelihoods, wherein each respective failure likelihood of the plurality of failure likelihoods represents a probability that a corresponding CAN node of the plurality of CAN nodes will fail within a given timeframe of the aerial vehicle, and wherein determining the statistical failure likelihood metric comprises, based on a first CAN node of the plurality of CAN nodes being at least double redundant, weighting a respective failure likelihood of the first CAN node differently from a respective failure likelihood of a non-redundant CAN node of the plurality of CAN nodes;
perform an action of the aerial vehicle in accordance with the statistical failure likelihood metric;
send signals, by the first CAN node, via a CAN bus connected to the plurality of CAN nodes;
determining, by the second CAN node, a failure state of the first CAN node based on receiving the signals sent by the first CAN node;
adjusting the statistical failure likelihood metric for the aerial vehicle based on determining the failure state of the first CAN node, wherein the adjusted statistical failure likelihood metric is indicative of a reduction in redundancy associated with the first CAN node caused by the failure state of the first CAN node;
determining that the adjusted statistical failure likelihood metric for the aerial vehicle meets or exceeds a failure likelihood threshold; and
responsive to determining that the adjusted statistical failure likelihood metric for the aerial vehicle meets or exceeds the failure likelihood threshold, change, by a CAN controller, the action of the aerial vehicle.

12. The system of claim 11, further comprising a plurality of additional components of the aerial vehicle that are associated with the plurality of CAN nodes, wherein determining the statistical failure likelihood metric comprises determining the statistical failure likelihood metric based on failure likelihoods of the plurality of additional components of the aerial vehicle.

13. The system of claim 12, wherein the program instructions are further executable by the plurality of processors to:
determine the failure likelihoods of the plurality of additional components of the aerial vehicle based on a number of flights associated with each of the plurality of additional components.

14. The system of claim 11, wherein the program instructions are further executable by the plurality of processors to:
determine a type of component of the aerial vehicle corresponding to the first CAN node, wherein determining the adjusted statistical failure likelihood metric comprises determining the adjusted statistical failure likelihood metric based on the type of component corresponding to the first CAN node.

15. The system of claim 14, wherein determining the adjusted statistical failure likelihood metric based on the type of component corresponding to the first CAN node comprises determining the adjusted statistical failure likelihood metric based on whether the first CAN node is a flight-critical flight module.

16. The system of claim 14, further comprising at least two CAN nodes configured to perform functions redundant to functions of the first CAN node such that the first CAN node is triple redundant before experiencing the failure state of the first CAN node, and wherein determining the adjusted statistical failure likelihood metric based on the type of component corresponding to the first CAN node comprises determining the adjusted statistical failure likelihood metric based on the redundancy associated with the first CAN node being reduced to double redundancy after experiencing the failure state of the first CAN node.

17. The system of claim 11, wherein the failure likelihood threshold is one of a plurality of failure likelihood thresholds, wherein each failure likelihood threshold of the plurality of failure likelihood thresholds corresponds to a different action of the aerial vehicle, and wherein changing the action of the aerial vehicle comprises changing the action of the aerial vehicle based on which of the plurality of failure likelihood thresholds the adjusted statistical failure likelihood metric meets or exceeds.

18. A non-transitory computer readable medium having program instructions stored thereon that are executable by a processor to perform functions, the functions comprising:
- determining a statistical failure likelihood metric for an aerial vehicle based on a plurality of failure likelihoods, wherein each respective failure likelihood of the plurality of failure likelihoods represents a probability that a corresponding controller area network (CAN) node of a plurality of CAN nodes of the aerial vehicle will fail within a given timeframe of the aerial vehicle, and wherein determining the statistical failure likelihood metric comprises, based on a first CAN node of the plurality of CAN nodes being at least double redundant, weighting a respective failure likelihood of the first CAN node differently from a respective failure likelihood of a non-redundant CAN node of the plurality of CAN nodes;
- performing an action of the aerial vehicle in accordance with the statistical failure likelihood metric;
- sending signals, by the first CAN node, via a CAN bus connected to the plurality of CAN nodes;
- determining, by a second CAN node of the plurality of CAN nodes, a failure state of the first CAN node based on receiving the signals sent by the first CAN node;
- adjusting the statistical failure likelihood metric for the aerial vehicle based on determining the failure state of the first CAN node, wherein the adjusted statistical failure likelihood metric is indicative of a reduction in redundancy associated with the first CAN node caused by the failure state of the first CAN node;
- determining that the adjusted statistical failure likelihood metric for the aerial vehicle meets or exceeds a failure likelihood threshold; and
- responsive to determining that the adjusted statistical failure likelihood metric for the aerial vehicle meets or exceeds the failure likelihood threshold, changing, by a CAN controller, the action of the aerial vehicle.

19. The non-transitory computer readable medium of claim 18, wherein determining the statistical failure likelihood metric comprises determining the statistical failure likelihood metric based on failure likelihoods of a plurality of components of the aerial vehicle that are associated with the plurality of CAN nodes.

20. The non-transitory computer readable medium of claim 18, the functions further comprising:
- determining a type of component of the aerial vehicle corresponding to the first CAN node, wherein determining the adjusted statistical failure likelihood metric comprises determining the adjusted statistical failure likelihood metric based on the type of component corresponding to the first CAN node.

* * * * *